(12) United States Patent
Leroux et al.

(10) Patent No.: US 10,708,966 B2
(45) Date of Patent: Jul. 7, 2020

(54) METHOD AND APPARATUS FOR UPLINK DATA TRANSMISSION USING MULTIPLE RADIO ACCESS TECHNOLOGIES

(71) Applicants: Philippe Leroux, Ottawa (CA); Aaron James Callard, Ottawa (CA)

(72) Inventors: Philippe Leroux, Ottawa (CA); Aaron James Callard, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 16 days.

(21) Appl. No.: 15/913,124

(22) Filed: Mar. 6, 2018

(65) Prior Publication Data
US 2018/0270889 A1 Sep. 20, 2018

Related U.S. Application Data

(60) Provisional application No. 62/472,931, filed on Mar. 17, 2017.

(51) Int. Cl.
| | |
|---|---|
| *H04W 76/15* | (2018.01) |
| *H04W 76/27* | (2018.01) |
| *H04W 52/02* | (2009.01) |
| H04W 28/08 | (2009.01) |
| H04W 72/04 | (2009.01) |
| H04W 84/12 | (2009.01) |

(52) U.S. Cl.
CPC ....... *H04W 76/15* (2018.02); *H04W 52/0209* (2013.01); *H04W 28/08* (2013.01); *H04W 72/0413* (2013.01); *H04W 76/27* (2018.02); *H04W 84/12* (2013.01); *Y02D 70/00* (2018.01); *Y02D 70/10* (2018.01); *Y02D 70/1262* (2018.01); *Y02D 70/14* (2018.01); *Y02D 70/142* (2018.01); *Y02D 70/24* (2018.01)

(58) Field of Classification Search
CPC .............................. H04W 76/15; H04W 84/12
See application file for complete search history.

(56) References Cited

U.S. PATENT DOCUMENTS

| | | | |
|---|---|---|---|
| 2012/0140690 | A1 | 6/2012 | Choi et al. |
| 2014/0293970 | A1 | 10/2014 | Damnjanovic et al. |
| 2016/0295627 | A1 | 10/2016 | Karout et al. |
| 2016/0309379 | A1* | 10/2016 | Pelletier ................ H04W 76/27 |
| 2016/0366629 | A1 | 12/2016 | Wu |
| 2018/0213584 | A1* | 7/2018 | Yang ..................... H04W 76/15 |

OTHER PUBLICATIONS

"UL data transmission without RRC signalling without initiating transition to active (option A)"; 3GPP TSG-RAN NR Adhoc R2-1700185; Spokane (WA), USA, Nov. 14-18, 2016.
"Evolved Universal Terrestrial Radio Access Network (E-UTRAN) and Wireless LAN (WLAN); Xw application protocol (XwAP)"; 3GPP TS 36.463 V14.0.0 (Dec. 2016).
(Continued)

*Primary Examiner* — Kent Krueger

(57) ABSTRACT

The present application provides a method and apparatus for uplink data transmission from a UE in a communications network, wherein the UE is configured for WLAN connectivity and wherein the UE is in RRC_INACTIVE state. The method comprises an uplink transmission from the UE in RRC_INACTIVE to a WT having a link with a gNB.

12 Claims, 14 Drawing Sheets

(56) References Cited

OTHER PUBLICATIONS

"Evolved Universal Terrestrial Radio Access (E-UTRA); LTE-WLAN Aggregation Adaptation Protocol (LWAAP) specification"; 3GPP TS 36.360 V13.0.0 (Mar. 2016).
"Evolved Universal Terrestrial Radio Access (E-UTRA) and Evolved Universal Terrestrial Radio Access Network (E-UTRAN); Overall description; Stage 2"; 3GPP TS 36.300 V14.1.0 (Dec. 2016).
"3GPP System Architecture Evolution (SAE); Security architecture"; 3GPP TS 33.401 V14.0.0 (Sep. 2016).

* cited by examiner

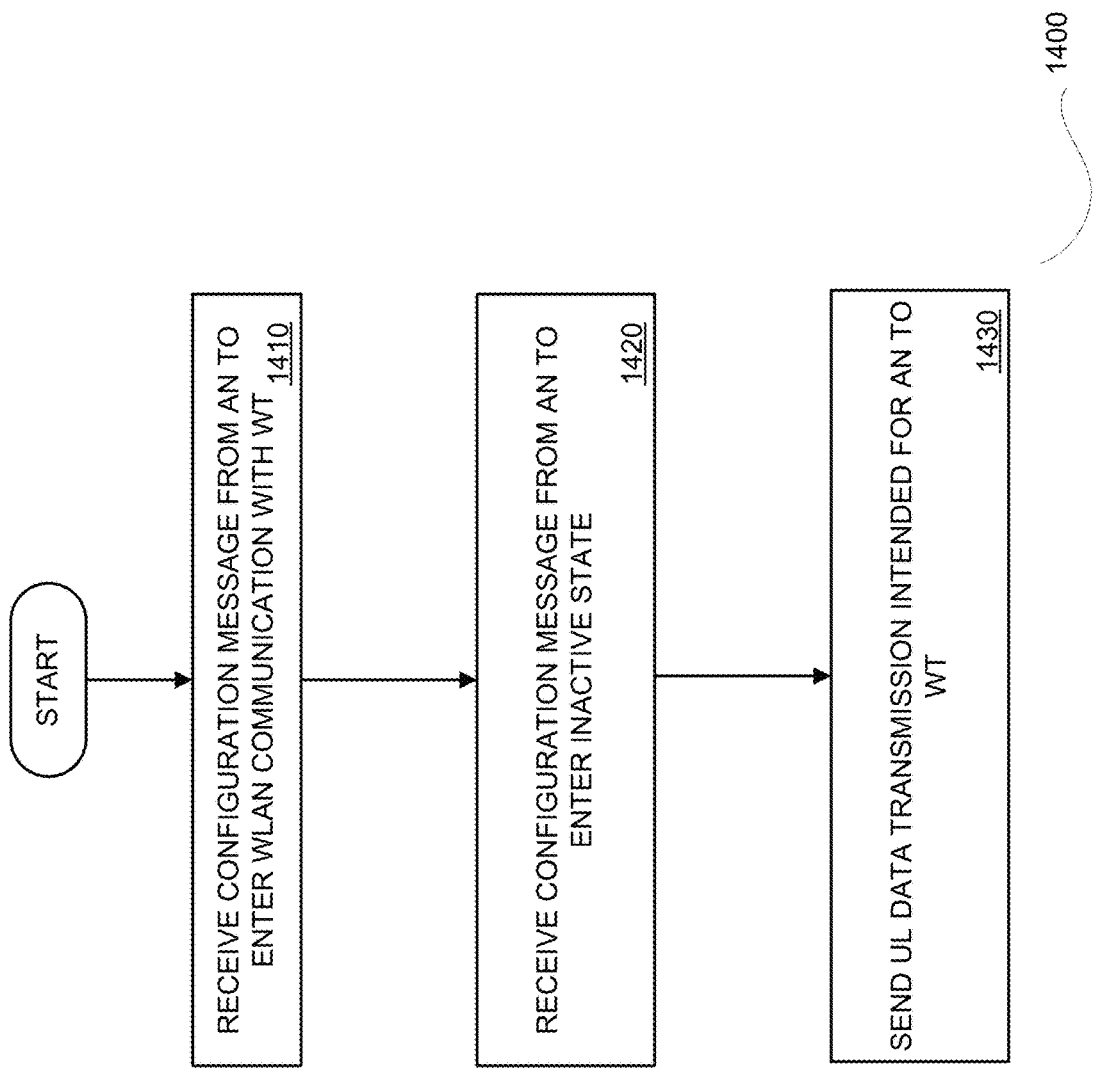

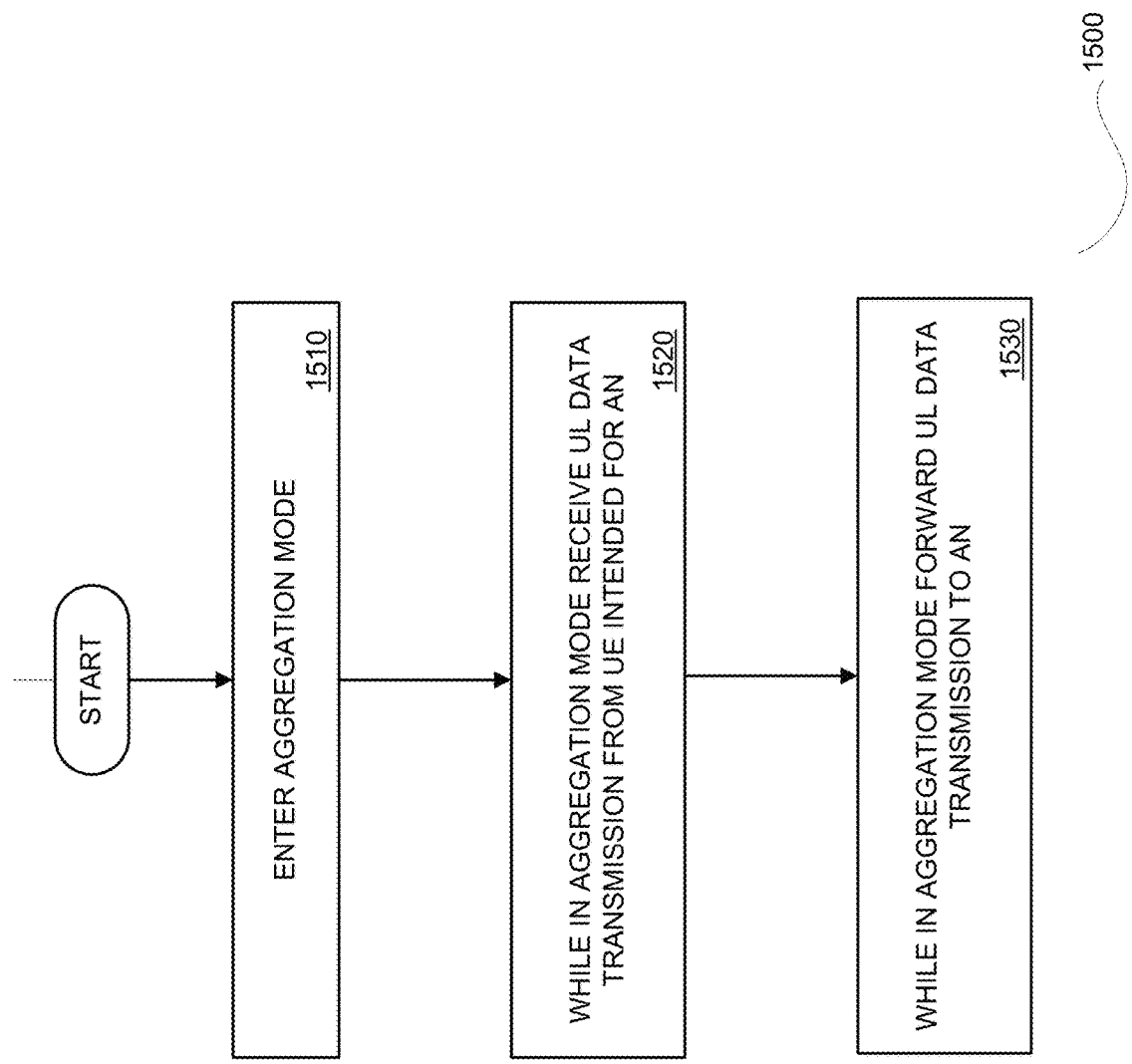

METHOD AND APPARATUS FOR UPLINK DATA TRANSMISSION USING MULTIPLE RADIO ACCESS TECHNOLOGIES

CROSS-REFERENCE TO RELATED APPLICATION(S)

The present disclosure is related to U.S. Provisional Patent Application No. 62/472,931 entitled "Method and Apparatus for Uplink Data Transmission Using Multiple Radio Access Technologies" filed Mar. 17, 2017, the contents of which are incorporated herein by reference, inclusive of all filed appendices.

FIELD OF THE INVENTION

The present invention pertains to the field of wireless communication networks and in particular to wireless communication networks employing the RRC_INACTIVE state at served mobile devices.

BACKGROUND

In next generation mobile networks (e.g., so-called Fifth-generation (5G) networks) it is anticipated that the number of devices will dramatically increase. Systems and methods are required to manage the resulting increased demand. Moreover, 5G intends to provide unifying and ubiquitous connectivity. LTE started providing such a feature by coupling 4G with Wi-Fi technology in the form of an aggregation mode such as, without limitation, LTE-WLAN Aggregation (LWA) or LTE/WLAN radio level integration with IPsec Tunnel (LWIP). This takes advantage of the fact that Wi-Fi can quite often provide higher energy efficiency (mostly due to its small-cell nature) and that data traffic can be off-loaded to other frequencies to reduce congestion.

It is expected that the number of devices in 5G will be an order of magnitude higher (in density) than in 4G, with the vast majority of devices intended to be in the RRC-INACTIVE state. Enabling more RATs increases the possibilities of load balancing. There remains a need, therefore, to consider and develop how RRC-INACTIVE in 5G interoperates with LWA or LWIP.

Therefore there may be a need for a method and apparatus for uplink data transmission in scenarios using multiple radio access technologies that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

It is an object of the present disclosure to obviate or mitigate at least one disadvantage of the prior art.

According to a first broad aspect of the present disclosure, there is disclosed a method for supporting UL data transmission between at least one UE and an AN in a mobile radio network supporting radio communications between the at least one UE and the AN, comprising actions, at the AN, of: configuring the at least one UE, along a radio communications link between the at least one UE and the AN to enter into WLAN communication with at least one WT node; configuring the at least one UE, along the radio communications link, to enter into an inactive radio state in which the at least one UE and the AN maintain context but the radio communications link is inactivated; and receiving from the at least one WT node in an aggregation mode, a UL data transmission from the at least one UE to the AN that is transmitted by the at least one UE to the at least one WT node.

In an embodiment, the method can further comprise, before the action of receiving, an action of receiving a configuration request from the WT node to enter the aggregation node. In an embodiment, the method can further comprise an action of sending an addition request to the at least one WT node in response to the configuration request. In an embodiment, the method can further comprise an action of receiving a confirmation from the at least one WT node in response to the addition request.

In an embodiment, the UL data transmission can comprise a UE identifier provided by the at least one UE to the at least one WT node. In an embodiment, the AN can use the UE identifier to associate UL data transmissions transmitted by the at least one WT node to the AN with the at least one UE.

In an embodiment, the action of receiving can comprise an action of establishing a separate communication link between the at least one WT node and the AN corresponding to individual ones of the at least one UE. In an embodiment, the action of receiving can comprise an action of establishing a common communication link between the at least one WT node and the AN for a plurality of the at least one UEs.

In an embodiment, the AN can be an anchor AN coupled by a communication link to the at least one WT node and the anchor AN receives the UL data transmission received by the at least one WT node along the communication link.

In an embodiment, the AN can be an anchor AN coupled by a first communication link to a serving AN and the serving AN can be coupled by a second communication link to the at least one WT node and the anchor AN can receive the UL data transmission received by the at least one WT node from the serving AN along the first communication link after the serving AN has received it from the at least one WT node along the second communication link. In an embodiment, the identity of the anchor AN can be determined by the serving AN. In an embodiment, the identity of the anchor AN can be determined by the at least one WT node and forwarded to the serving AN together with the UL data transmission.

According to a second broad aspect of the present disclosure there is disclosed an AN in a mobile radio network supporting radio communications with at least one UE, comprising a processor and a non-transient memory. The non-transient memory is for storing instructions that, when executed by the processor, cause the AN to perform actions, for supporting UL data transmission between the at least one UE and the AN, of: configuring the at least one UE, along a radio communications link between the at least one UE and the AN, to enter into WLAN communication with at least one WT node; configuring the at least one UE, along the radio communications link, to enter into an inactive radio state in which the at least one UE and the AN maintain context but the radio communications link is inactivated; and receiving from the at least one WT node in an aggregation mode, a UL data transmission from the at least one UE to the AN that is transmitted by the at least one UE to the at least one WT node.

According to a third broad aspect of the present disclosure, there is disclosed a method for supporting UL data transmission between a UE and an AN in a mobile radio network supporting radio communications between the UE and the AN, comprising actions, at the UE of: receiving a configuration message, along a radio communications link between the AN and the UE, to enter into WLAN communication with at least one WT node; receiving a configuration message, along the radio communications link, to enter into an inactive radio state in which the UE and the AN maintain context but the radio communications link in inactivated; and thereafter sending UL data transmissions intended for the AN to the at least one WT node in an aggregation mode for forwarding to the AN.

In an embodiment, the method can further comprise, before the action of sending UL data transmissions, an action of sending an authentication request to the at least one WT node to enter the aggregation mode.

In an embodiment, the UL data transmissions can comprise a UE identifier identifying the UE to the at least one WT node.

According to a fourth broad aspect of the present disclosure, there is disclosed a UE in a mobile radio network supporting radio communications with an AN, comprising a processor and a non-transient memory. The non-transient memory is for storing instructions that, when executed by the processor, cause the UE to perform actions, for supporting UL data transmission between the UE and the AN, of: receiving a configuration message along a radio communications link between the AN and the UE, to enter into WLAN communication with at least one WT node; receiving a configuration message, along the radio communications link, to enter into an inactive radio state in which the UE and the AN maintain context but the radio communications link is inactivated; and thereafter sending UL data transmissions intended for the AN by WLAN communication to the WT node for forwarding to the AN.

According to a fifth broad aspect of the present disclosure, there is disclosed a method for supporting UL data transmission between at least one UE and an AN in a mobile radio network supporting radio communications between the at least one UE and the AN, comprising actions, at a WT node coupled to the at least one UE of: entering an aggregation mode; and while in the aggregation mode: receiving a UL data transmission from the at least one UE and intended for the AN; and forwarding the UL data transmission to the AN.

In an embodiment, the WT node can enter the aggregation mode upon receiving an authentication request from the at least one UE. In an embodiment, the method can further comprise an action of sending a configuration request to the AN upon receipt of the authentication request. In an embodiment, the method can further comprise an action of receiving an addition request from the AN in response to the configuration request. In an embodiment, the method can further comprise an action of sending a confirmation to the AN in response to the addition request.

In an embodiment, the UL data transmission can comprise a UE identifier. In an embodiment, the method can further comprise an action of inferring an identity of the AN from the UE identifier. In an embodiment, the method can further comprise an action of forwarding the UE identifier to the AN so that the AN can associate UL data transmissions forwarded by the WT node with the at least one UE.

In an embodiment, the at least one WT node can send the UL data transmissions along separate communication links between the at least one WT node and the AN corresponding to individual ones of the at least one UE. In an embodiment, the at least one WT node can send the UL data transmissions along a common communication link between the at least one WT node and the AN for a plurality of the at least one UEs.

According to a sixth broad aspect of the present disclosure, there is disclosed a WT node coupled to at least one UE in a mobile radio network supporting radio communications with an AN, comprising a processor and a non-transient memory. The non-transient memory is for storing instructions that, when executed by the processor, cause the WT node to perform actions, for supporting UL data transmission between the at least one UE and the AN, of: entering an aggregation mode; and while in the aggregation mode: receiving a UL data transmission between the at least one UE and the AN from the at least one UE; and forwarding the UL data transmission to the AN.

BRIEF DESCRIPTION OF THE FIGURES

Further features and advantages of the present invention will become apparent from the following detailed description, taken in combination with the appended drawings, in which:

FIG. 14 is a flow chart illustrating an example of a method at the UE for supporting UL data transmission between it and the AN according to an example.

FIG. 15 is a flow chart illustrating an example of a method at the WT for supporting UL data transmission between the UE and the AN according to an example.

It will be noted that throughout the appended drawings, like features are identified by like reference numerals.

DETAILED DESCRIPTION

Figure 2:
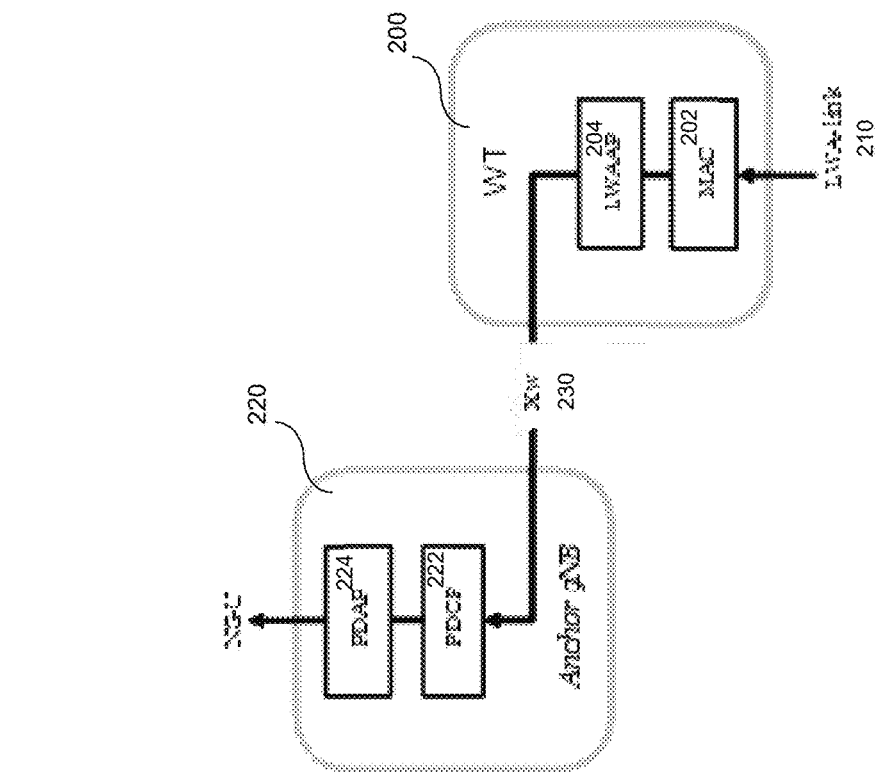
FIG. 2 is a schematic depiction of an embodiment of a protocol stack model for LWA.

Various acronyms as used herein are defined in the following non-exhaustive list:
AP: Access Point
DRB: Data Radio Bearer
LWA: LTE-WLAN Aggregation
LWAAP: LTE-WLAN Aggregation Adaptation Protocol
LWIP: LTE/WLAN radio level integration with IPsec Tunnel
PDCP: Packet Data Convergence Protocol
PDU: Protocol Data Unit
MAC: Media Access Control
RAN: Radio Access Network
RAT: Radio Access Technology
SSID: Service Set Identifier
TB: Transport Block
UE: User Equipment
UEID: User Equipment Identifier
UL: Uplink
Wi-Fi: a technology for wireless local area networking with devices based on the IEEE 802.11 standards
WLAN: Wireless Local Area Network
WT: WLAN termination
Xn: interface between gNBs
Xw: standardized LTE-WLAN interface As used herein, the terms Electronic Device (ED), "User Equipment" (UE) and "mobile device" are used to refer to one of a variety of devices, such as a consumer or machine-type device, which communicates with an access node via wireless communication. One skilled in the art will appreciate that a mobile device is a device designed to connect to a mobile network. This connection typically makes use of a wireless connection to an access node. An access node (AN) may be a base station, Wi-Fi access point, NodeB, evolved NodeB, gNodeB, or other device which provides a point of access to a backhaul network. Although the mobile network is designed to support mobility, it is not necessary that the mobile device itself be mobile. Some mobile devices, such as metering devices (e.g., smart meters) may not be capable of mobility, but still make use of the mobile network.

As used herein, a "network" or "communication network" or "mobile network" may provide communication services to various devices including but not necessarily limited to mobile devices. A mobile device can communicate with radio nodes using a protocol and have its data routed to a designated destination. Such a network may include a radio access portion and backhaul portion. The network may further comprise various virtualized components as will become readily apparent herein.

The present application provides a method, system and apparatus for uplink data transmission from a UE in a communications network, wherein the UE is configured for WLAN connectivity and wherein the UE is in RRC_INACTIVE state. The method comprises an uplink transmission from the UE in RRC_INACTIVE to a WT having a link with a gNB. Embodiments of this method, and the supporting system and apparatus, are detailed below.

In LTE there are two commonly recognized RRC states: RRC_IDLE and RRC_CONNECTED (with variations of this state). A UE is in RRC_CONNECTED when an RRC connection is established. When there is no established connection, the UE is in RRC_IDLE mode, which can save energy and prevents the RAN from having to keep context. During RRC_IDLE the radio is inactive but the IP address is assigned and tracked by the network. However, the network cannot transmit and/or receive data to or from the UE when it is in the RRC_IDLE mode.

5G has introduced an RRC_INACTIVE state wherein the UE and the RAN keep some context (at least PDCP) and the UE may have the ability to start a transmission to a same or new cell (within a tracking area) without first requesting an RRC_CONNECTED state.

Potential purposes of the RRC_INACTIVE state include:
to enable faster reactivation of a connection (optimization scheme);
reduce core network signaling;
to add flexibility to the gNB to put UEs in a state where they do not have to handle RRC connections (signaling simplification scheme).

In the 3GPP LTE Release 14 (R-14), LWA provides the possibility for a gNB to offload traffic over an IEEE 802.11 connection. As used herein, the term "IEEE 802.11 connection" refers to a wireless local area network (WLAN) connection. In offloading traffic over an IEEE 802.11 connection, the gNB uses a 3GPP defined node referred to as the WLAN termination (WT). PDCP PDUs are routed to the WT over an established per E-RAB Xw link to the WT, encapsulated by a LWAAP, which adds the DRB identification number. The IEEE 802.11 layer is unmodified. The technicalities for authentication are clarified whereby the UE is configured as well as an AAA server. The WT queries the AAA server in order to determine whether to allow the UE to establish a link to a WT over the IEEE 802.11 connection. In the present prior art there is no rerouting of RRC signaling over LWA.

LTE/WLAN radio level integration with IPsec Tunneling, or LWIP, is an alternate method of using IEEE 802.11 connectivity between the higher layer of a gNB and the UE. A main difference between LWIP and LWA is that LWIP establishes an IPSec tunnel from the UE to a Serving Gateway, which is roughly equivalent to the WT node in LWA.

Methods, systems and apparatus described herein can be adapted to LWIP with the modification of configuring target Serving Gateways to provide a mobility mechanism with the IPSec tunnel.

The methods, systems and apparatus of the present application are described herein with reference to cases where a UE has been configured with an LWA configuration. In some embodiments, this configuration is extended to support an LWA-INACTIVE state. This differs from the scenario where a UE, without prior configuration, connects to a non 3GPP network and establishes a link to a 3GPP Core network, which has been previously studied.

As referenced herein, an LWA-INACTIVE state is one where the UE is put in RRC-INACTIVE by the RAN and has a configuration of LWA that enables data exchange over LWA. In an LWA-INACTIVE connection the WT recognizes that the UE is RRC_INACTIVE and, consequently, requires different treatment than RRC_CONNECTED. An LWA-ACTIVE connection is one where the UE is RRC_INACTIVE and the WT has no knowledge that the UE is RRC_INACTIVE. In some situations, there is a large distributed SSID of LWA terminals and, consequently, the UE is expected to migrate amongst different WT where the configuration is still acceptable, while handover would typically occur if the UE was in an RRC_CONNECTED state.

The presently provided system and method can be used to support an uplink data transmission (RRC_INACTIVE UL- Tx) while the UE is in RRC-INACTIVE state. This requires that the WT is capable of receiving a PDU from a UE, and then identifying where to forward the payload for it to be processed at an anchor gNB. The "anchor gNB" is the gNB that maintains the UE's context, and that may, but not necessarily, have pushed the UE into RRC_INACTIVE.

When and how to initiate the RRC-INACTIVE state may vary. Provided the UE has such a valid LWA configuration (i.e., LWA-ACTIVE or LWA-INACTIVE), it can monitor Wi-Fi APs. When the gNB detects a lack of UE-related activity, it can decide to put the UE in RRC-INACTIVE. At the same time, the gNB may indicate to the UE that the UE is to use Wi-Fi first (if available) for any UL transmissions, and tell the UE not to request the cellular network to reestablish an RRC_CONNECTED state. Alternatively, the UE may be configured to choose which RAT to use for UL-INACTIVE transmissions. For example, it may choose the 5G network to push a packet having a particular level of QoS required, and otherwise use the LWA RAT in order to save energy/signaling.

The UE may also monitor the cells system information (SI) which can indicate the loading, and also monitor the loading of the Wi-Fi (e.g., as indirectly indicated by a CSMA/CA procedure and exponential back-off window, as well as information broadcast over WiFi). Provided with those values the UE may be configured to attempt to transmit on LWA and, as a fall-back position, attempt to transmit via the 5G network (e.g., if the back-off window grows too much or too many attempts have been made).

Figure 1:
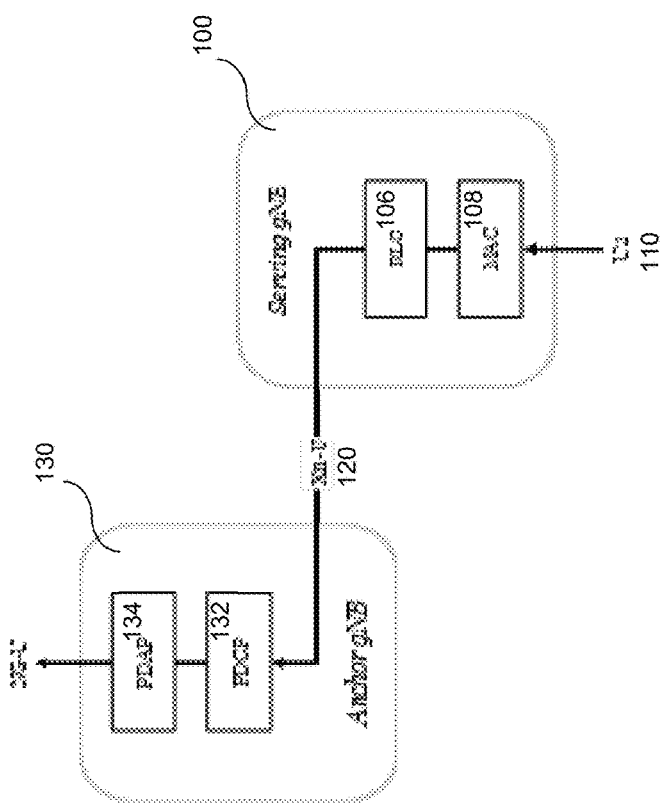
FIG. 1 is a schematic depiction of an RRC-INACTIVE or DC protocol stack model that may be used, according to some embodiments, for uplink transmission from a UE (not shown) in RRC_INACTIVE mode, via a serving gNB.

FIG. 1 schematically depicts an RRC-INACTIVE or DC protocol stack model that may be used for uplink transmission from a UE (not shown) in RRC_INACTIVE mode, via a serving gNB 100. Serving gNB 100 receives uplink transmissions over Uu 110 from the UE, which are then transmitted over Xn-U 120 to Anchor gNB 130. Anchor gNB 130 includes a PDCP layer 132 and a PDAP layer 134. Serving gNB 100 includes an RLC layer 106 and an MAC layer 108. PDAP 134 transmits via NG-U.

The protocol stack model for LWA is depicted in FIG. 2 and is inspired by RRC-INACTIVE or DC protocol stack model, with some modifications on the protocol. As shown in FIG. 2, the LWA stack model for RRC_INACTIVE may be used for uplink transmissions from a UE (not shown). In the scenario of FIG. 2, a WT 200 is used rather than the serving gNB 100. The uplink transmissions are transmitted to WT 200 over LWA-link 210, and from WT 200 to Anchor gNB 220 over Xw 230. WT 200 includes an MAC layer 202 and a LWAAP layer 204. Anchor gNB 220 includes a PDCP layer 222 and a PDAP layer 224.

Figure 3:
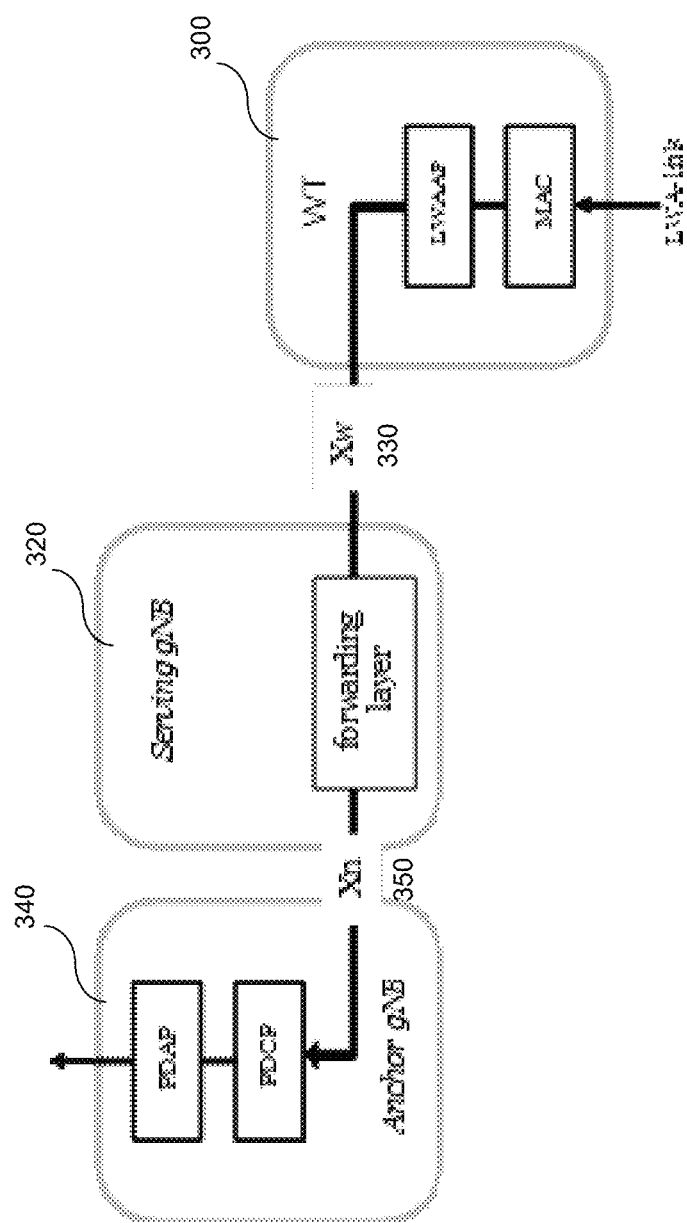
FIG. 3 is a schematic depiction of an embodiment of an extended LWA-INACTIVE protocol data stack model.

Many UE's are mobile, which means that the WT that they connect with may not be connected to their anchor gNB. Accordingly, with roaming, there can be an intermediary gNB necessary to relay the payload from a UE in RRC_INACTIVE mode to the anchor gNB. An embodiment of a protocol data stack model for this alternative is depicted in FIG. 3. In this embodiment uplink transmissions from a UE (not shown) are transmitted to WT 300 via LWA-link 310, and from WT 300 to a serving gNB 320 via Xw 330. Serving gNB then forwards the payload to anchor gNB 340 via Xn 350. The configuration will depend on how the WT is connected to the RAN.

The present application provides at least four, non-limiting, alternatives for the present method and system for transmitting uplinks from a UE in RRC_INACTIVE. It should be understood that the four alternatives may be used in combination. The first alternative essentially keeps the LWA interface unaware of the state of the device. The second alternative keeps the WT unaware of the state of the device but modifies the behaviour of the gNB, and UE. The third, and fourth alternatives have all three devices aware of the new state. These alternatives (or Scenarios) are described in more detail below.

It should be noted that currently there is no uplink transmission in LWA (R-13).

Scenario 1: LWA Unaware of Inactive State

In this scenario the UE has been attached via LWA, or is otherwise configured with the appropriate information (including authentication parameters and Wi-Fi Aps/SSID/MACs). The gNB makes a determination to put that UE into RRC-INACTIVE state. However, the gNB does not inform the WT of this action. The UE would transmit any UL data it had normally over the WT. There are several variations on this scenario depending on whether the UE is expected to receive information from the WT on the DL.

In one embodiment, DL data is received from gNB (traditional paging procedure). In this variation, the UE in RRC_INACTIVE is not required to listen to the WT for DL traffic. Rather, paging is performed using the 5G band. Consequently, the UE does not necessarily inform the gNB when the device leaves or enters the WT coverage area.

The UE may be configured to respond to paging over the WT band.

The UE may also be configured to send an RRC message over LWA if it finds that it is out of reach of any 5G (e.g., cellular) nodes but it has access to Wi-Fi (e.g., for indoor deployments). The UE may be configured to send and receive RRC messages, for example, by encapsulating those with a Signaling radio bearer ID. In this way, the UE can have handover procedures between gNBs, with its context fetched and updated and synchronized with the UE.

In another embodiment DL data is received from the WT. In this variation the UE in RRC_INACTIVE listens to the WT for DL traffic and, if the UE leaves the coverage of the WT a message similar to RAN tracking area update is sent. The UE performs a 'handover' from multiple devices under control of the WT in a manner similar to a device in active mode.

Figure 4:
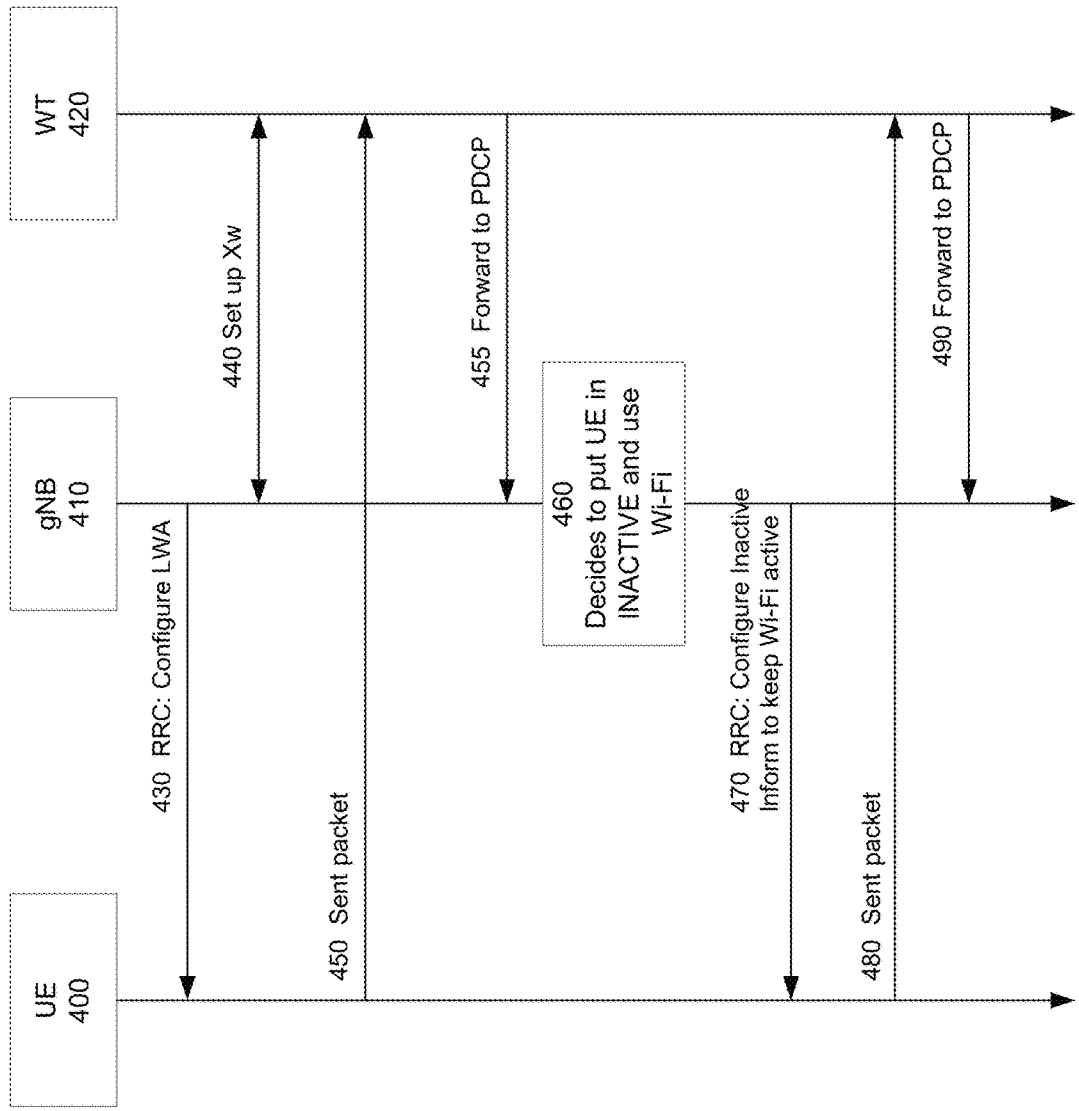
FIG. 4 is a signaling diagram summarizing an embodiment of a method for an LWA-ACTIVE transmission while the UE is RRC_INACTIVE.

FIG. 4 is a signaling diagram summarizing an embodiment of a method used for LWA-ACTIVE in RRC_INACTIVE state. In step 430 gNB 410 uses the RRC connection to configure the UE 400 for LWA so that UE 400 can communicate directly with WT 420. In step 440 gNB 410 and WT 420 communicate to set-up connection Xw between gNB 410 and WT 420. Once this is complete, in step 450 the UE 400 transmits a data packet to WT 420, which is then forwarded, in step 455, to the PDCP layer of gNB 410. Steps 430 to 455 are for LWA configuration and usage, prior to the UE becoming RRC_INACTIVE.

In the example shown in FIG. 4, at step 460, gNB 410 decides to put UE 400 in RRC_INACTIVE and use Wi-Fi. However, the Xw set up between gNB 410 and WT 420 is retained. Next, at step 470, gNB 410 configures UE 400 RRC_INACTIVE and informs UE 400 to keep Wi-Fi active. In this configuration, UE 400 transmits a packet, at step 480, to WT 420, which is then which is then forwarded, in step 490 to the PDCP layer of gNB 410.

In some examples of the method shown in FIG. 4, the gNB may configure multiple Xw interfaces to different WTs in order to support a limited form of roaming. The UE should in this case be configured with a method to access different WT (e.g. in a manner similar to what is described in the next embodiment in which the LWA remains unaware of the state of the UE but the gNB and UE are modified). Alternatively, the UE may be configured with authentication and the WT/Wi-FiAPs provide the same SSID and use the same AAA server.

In this embodiment, in which the LWA is unaware of the RRC_INACTIVE state of the UE, many Xw interfaces may be required to be maintained and UE roaming may not be possible. In this embodiment, roaming may be made possible by maintaining many Xw, or by using one WT for many Wi-Fi APs. Further, signaling and storage may be expected to grow linearly with number of devices in RRC_INACTIVE. However, this method is relatively easy to implement, the RRC state may remain RRC_INACTIVE until UE or gNB explicitly requests otherwise, and the WT is unaware of RRC_INACTIVE state. This method potentially saves energy for the UE transmissions and supports off-loading of RRC-INACTIVE UEs for the gNB. This has the PDCP layer of the UE processes data transmitted over WiFi links while the UE is in RRC_INACTIVE, potentially while transmissions over 5G/LTE links are disallowed.

Because the Xw link remains active, the WT may forward the received UL packet to the anchor gNB (e.g., without errors). The UE can follow normal LWA procedures and may determine when and whether to poll the PDCP acknowledgment status message. For instance, the UE may determine that an 802.11x ACK is a sufficient acknowledgement, and that in order to conserve energy it will not poll the PDCP, and therefore be able to stop listening to the Wi-Fi channel if the UE does not expect further downlink data.

According to embodiments of the present invention, when a UE is transitioned into RRC_INACTIVE, the UE receives instructions regarding actions to be performed in relation to the LWA connection associated with the UE (e.g., maintain the UE in LWA-ACTIVE or in LWA-INACTIVE). In some embodiments, these instructions can be predefined in relation to the operational characteristics of the UE. In some embodiments, if the UE is kept LWA-ACTIVE, the UE may additionally receive instructions to use LWA for uplink transmission preference. In some embodiments, the UE may additionally receive information regarding whether or not the UE should expect downlink traffic on LWA.

According to some embodiments, if the UE is not expected to have any transmissions (UL/DL), there is no requirement for any LWA configuration, since there may be more energy savings to shut down the LWA connection. However, in some embodiments the LWA connection can be maintained for DL and/or for UL activity.

Additionally, in another embodiment, the UE may optionally receive a configuration message to request the UE to update over 5G RRC_INACTIVE when the UE loses connectivity to the WT.

In another embodiment, RRC may optionally be used over LWA to allow gNB configuration modification without reconnecting (paging) the UE.

Scenario 2: LWA Unaware, but Modified UE-gNB Interface

In this embodiment a UE in the RRC_INACTIVE state, embeds additional data within its payload when transmitting to the WT. Additionally, the gNB may, prior to putting the UE in RRC_INACTIVE, (re)configure the WT to use a specific Xw interface. For the gNB this specific Xw will multiplex data from multiple UEs in RRC_INACTIVE and the extra information embedded by the UEs is used by the gNB to differentiate between multiple RRC_INACTIVE UEs. This allows the gNB to release/reuse the parameters associated with this UE in an orderly manner.

The UE may embed additional information about the UE in the transferred payload (e.g., in PDCP header, LWAAP header or alternate layer). This may include the UE ID, Resume ID or other identifier. This field can be used by the gNB to either fetch the needed context, or forward the payload to the appropriate gNB.

Figure 5:
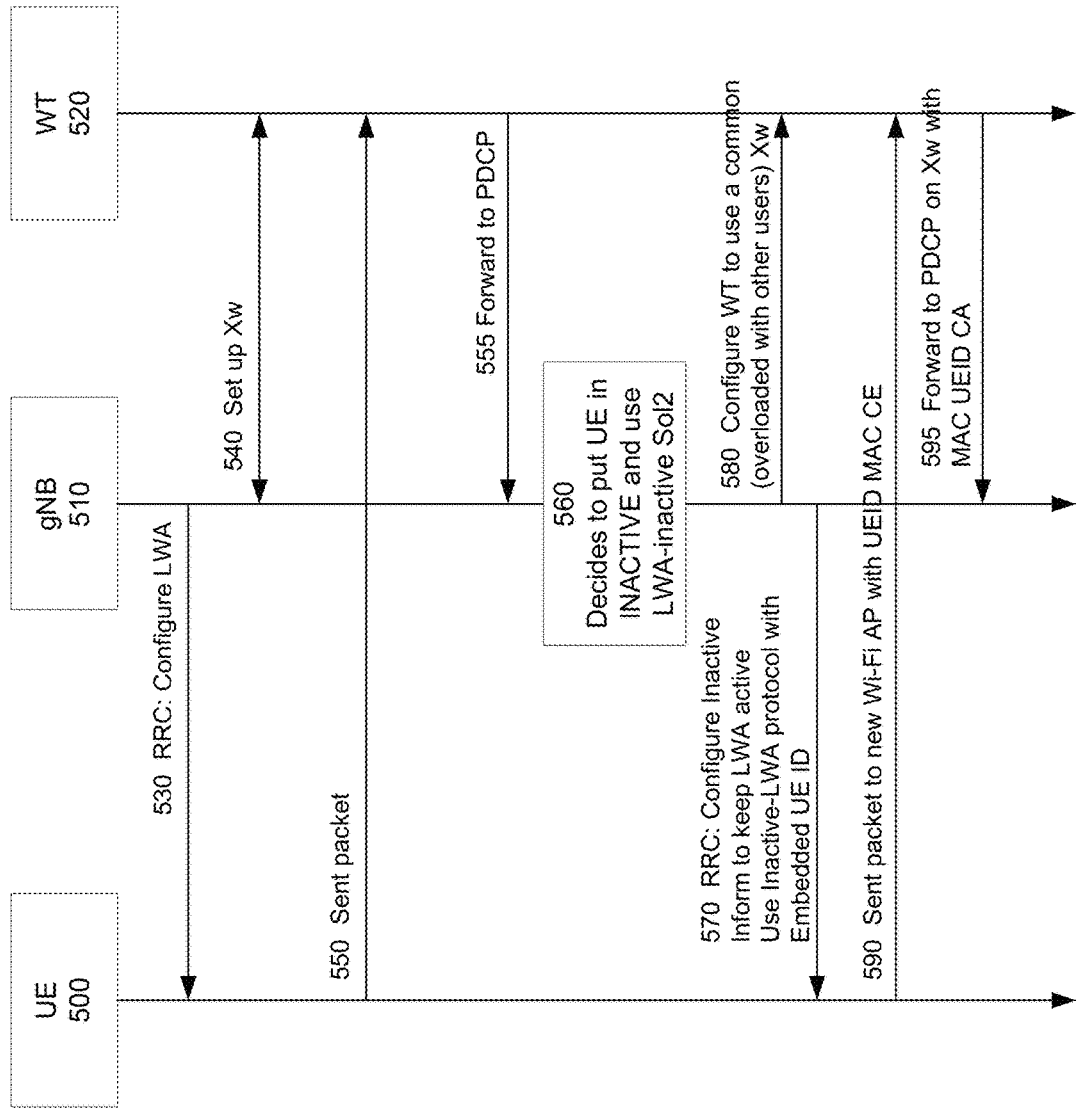
FIG. 5 is a signaling diagram illustrating an embodiment of a method for uplink transmission while the UE is RRC_INACTIVE, which employs LWAAP Inactive protocol and a shared Xw.

FIG. 5 is a signaling diagram illustrating an embodiment of this method, which employs LWAAP Inactive protocol and a shared Xw. As illustrated in FIG. 5, in step 530 gNB 510 uses the RRC connection to configure the UE 500 for LWA so that UE 500 can communicate directly with WT 520. In step 540 gNB 510 and WT 520 communicate to set-up connection Xw between gNB 510 and WT 520. Once this is complete, in step 550 the UE 400 transmits a data packet to WT 520, which is then forwarded, in step 555, to the PDCP layer of gNB 510.

In the example shown in FIG. 5, at step 560, gNB 510 decides to put UE 500 in RRC_INACTIVE and use LWA-Inactive. Next, at step 570, gNB 510 configures WT 520 to use a common Xw (i.e., one that is overloaded with other users). At step 580, gNB 510 configures UE 500 RRC_INACTIVE and informs UE 500 to keep LWA active and use Inactive LWA protocol with embedded UEID. In this configuration, UE 500 transmits a packet, at step 590, to WT 520 at a new WiFi AP with UEID MAC CE. The packet is then forwarded, in step 595, to the PDCP layer of gNB 510, on the common Xw with MAC UEID CE.

The method described above and illustrated in FIG. 5 results in fewer Xw links than in the method illustrated in FIG. 4, however, it requires a default active Xw to each WT. This method is not anticipated at this time to require significant changes to standards (e.g., the 3GPP Technical Standards document numbered TS 36.463 and entitled "Evolved Universal Terrestrial Radio Access Network (E-UTRAN) and Wireless LAN (WLAN); Xw application protocol (XwAP)", (Jan. 11, 2017).).

This method also allows the WT to remain unchanged. However, only limited roaming of the UE is supported by this method. In particular, roaming is limited to the 'default' Xw-connected WT to which the gNB is already connected.

In some embodiments, changes to standards may be made to implement the above-described method and system. For example, a different LWAP protocol for UEs in RRC_INACTIVE may be made, and provisions for overloaded Xw (the current standard should support this or at least not preclude this).

Scenario 3: UE Initiated LWA Authentication

In this embodiment, the WT is notified of (or possibly otherwise determines) a UE's RRC_INACTIVE status. In this method the UE can send a special message to the WT and the WT determines that it should check for this message because it does not have a configured Xw for that UE. The message prompts the WT to send a message to a gNB requesting a Xw/LWA configuration (i.e., a LWA configuration request). For small data transfers, the payload may also be piggy backed with this request. If the WT is connected to multiple gNB it may choose the gNB which corresponds the identifier received from the UE (Resume ID).

Figure 6:
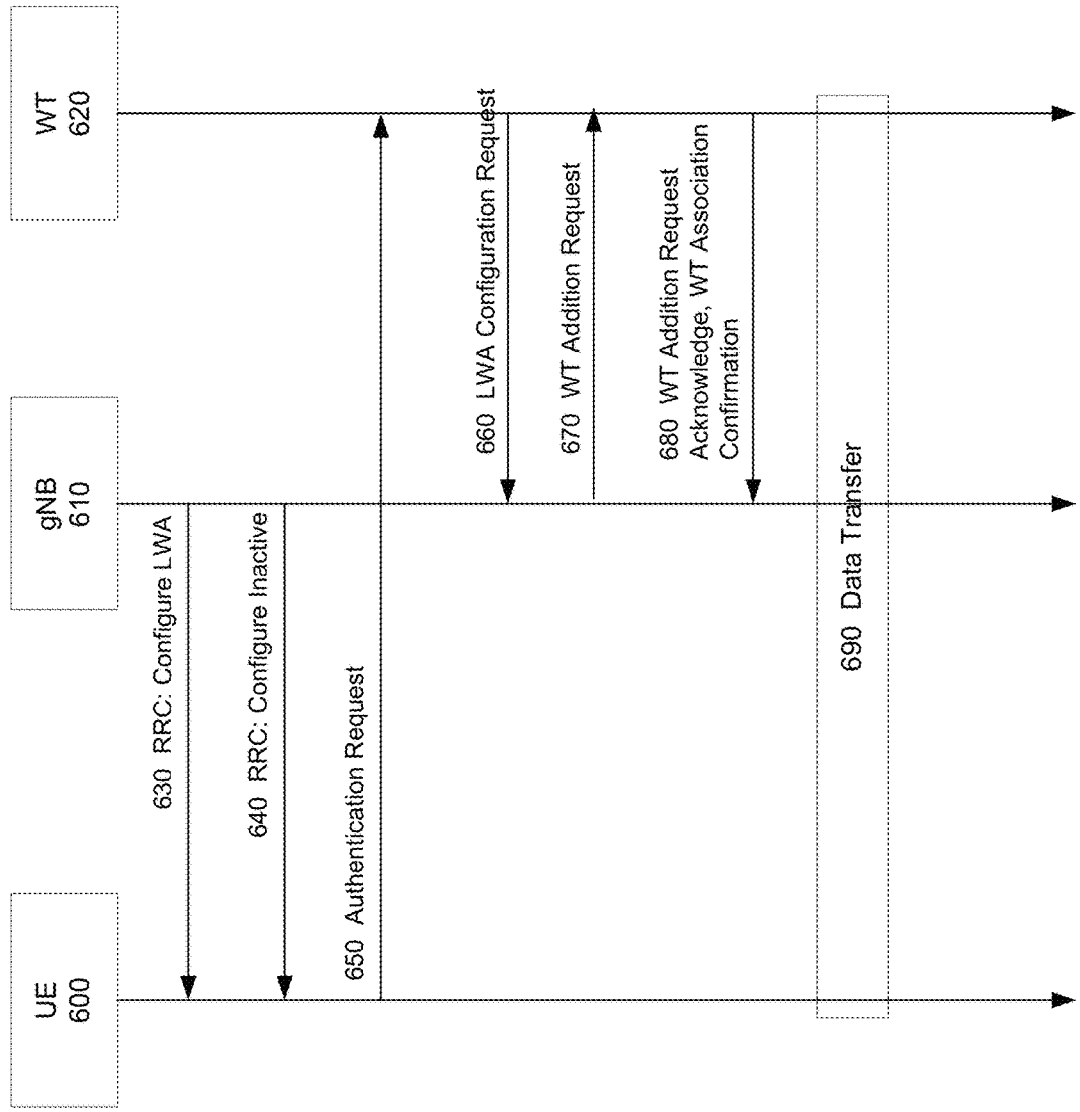
FIG. 6 is a signaling diagram illustrating an embodiment of a method for uplink transmission while the UE is RRC_INACTIVE, which uses UE initiated LWA authentication.

FIG. 6 is a signaling diagram illustrating a method for uplink transmission in which the WT is aware of the UE's RRC_INACTIVE state. The method includes step 630, in which gNB 610 uses the RRC Configure message to configure the UE 600 for LWA. In step 640 gNB 610 then configures UE 600 as RRC_INACTIVE. In step 650 UE 600 transmits an authentication request with UEID to WT 620. In step 660 WT 620 sends an LWA configuration request with UEID to the gNB 610. At step 670 gNB 610 sends a WT addition request to WT 620. In response, at step 680, WT 610 sends a WT addition request acknowledgement and a WT association confirmation. Once this is complete, data transfer between UE 600, gNB 610 and WT 620 occurs at step 690. Not shown is the choice of gNB to send the configuration request to.

The WT 620 may consult the gNB ID as part of the sent message to determine which gNB to send to, or alternatively forward it to a fixed gNB, which then handles the forwarding aspects. In some embodiments, the WT 620 may determine the anchor gNB ID from this sent message (the UEID).

With the LWA reconnected, the data transfer may happen either via solution 1 or 2 (i.e., Scenario 1 or 2 described above) depending on how the Xw link is established. In particular, the UE no longer needs to send UEIDs, and the WT no longer needs to identify the UE as RRC_INACTIVE or RRC_CONNECTED; the WT only knows that it has a configured Xw for this UE. In some embodiments, the method comprises configuring the UE to use either solution 1 or solution 2. In other embodiments, the UE can be configured to use one or the other upon establishment of the Xw link.

During implementation of this embodiment, the UEID provided is used by the WT to identify which gNB to talk to, in order to keep the context set within RRC_INACTIVE and resume the data connectivity over LWA.

In an alternative procedure, a new connection is set up from outside of RRC_INACTIVE state (e.g., if the WT cannot reach the original anchor gNB, or if the UE is RRC_IDLE but has been configured to authenticate to WT).

Then there is a need for a new connection setup which resets the PDCP and the anchor gNB. The gNB to which the WT can communicate can go through the normal PDU Session setup procedure to receive new PDCP keys. The keys can be provided to the UE over LWA. RRC over LWA may therefore be defined to support this.

In the scenario of an RRC_IDLE LWA connection request, it is not a UEID that is provided, but rather a similar UE identifier is provided by the UE upon connection request. The gNB then provides it with a temporary UE identifier as it would over 5G (e.g. cellular), but using the RRC over LWA connection.

In the scenario where the UE is in RRC_INACTIVE but the WT cannot reach the anchor gNB, a fallback method is used where the WT replies to the UE by a "reset connection/ ask for new connection", unless the UEID of RRC_INACTIVE can directly be used as a temporary UEID by the RAN in order to continue the connection setup procedure with the CN.

A potential feature of this embodiment, in which there is an UE initiated LWA authentication at the WT, is that there is no need to configure the WT ahead of time to establish the Xw. However, this embodiment may require more standard changes (e.g., the whole procedure to establish Xw initiated from UE-WT authentication).

Scenario 4: Reuse 5G Backhaul Protocol

This scenario provides another embodiment supporting uplink transmission from a UE in RRC_INACTIVE. In this embodiment an Inactive-LWA state is maintained and there is no Xw setup or pre-configuration.

In particular, in this embodiment, there is potentially no establishment or reestablishment of an Xw link; the WT only acts as a transparent relay for an otherwise equivalent RRC_INACTIVE UL Tx if it were done via 5G gNB.

Figure 7:
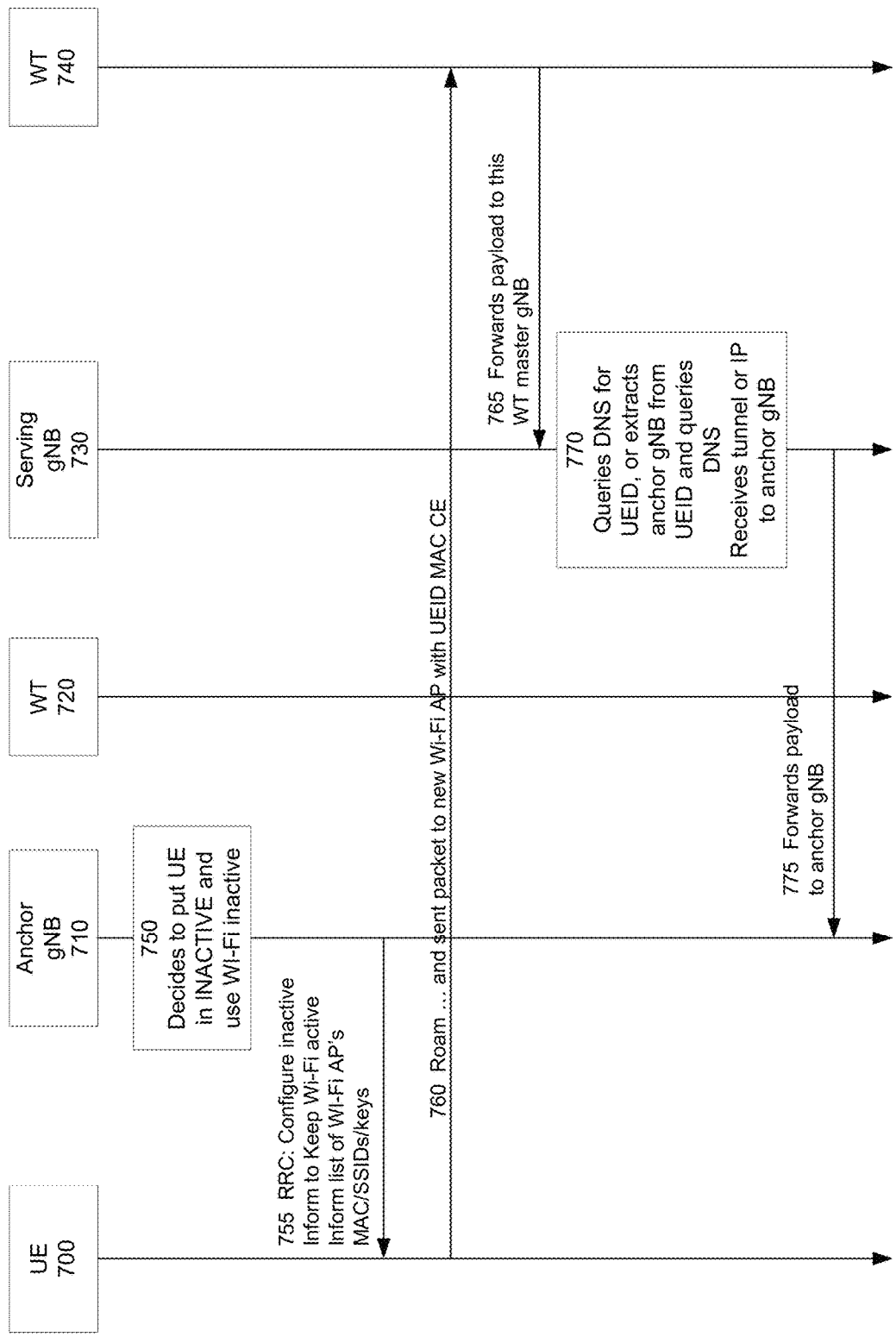
FIG. 7 is a signaling diagram illustrating an embodiment of a method for uplink transmission while the UE is RRC_INACTIVE and the WT acts as a transparent relay with a master gNB handling the LWA-INACTIVE payload.
Figure 8:
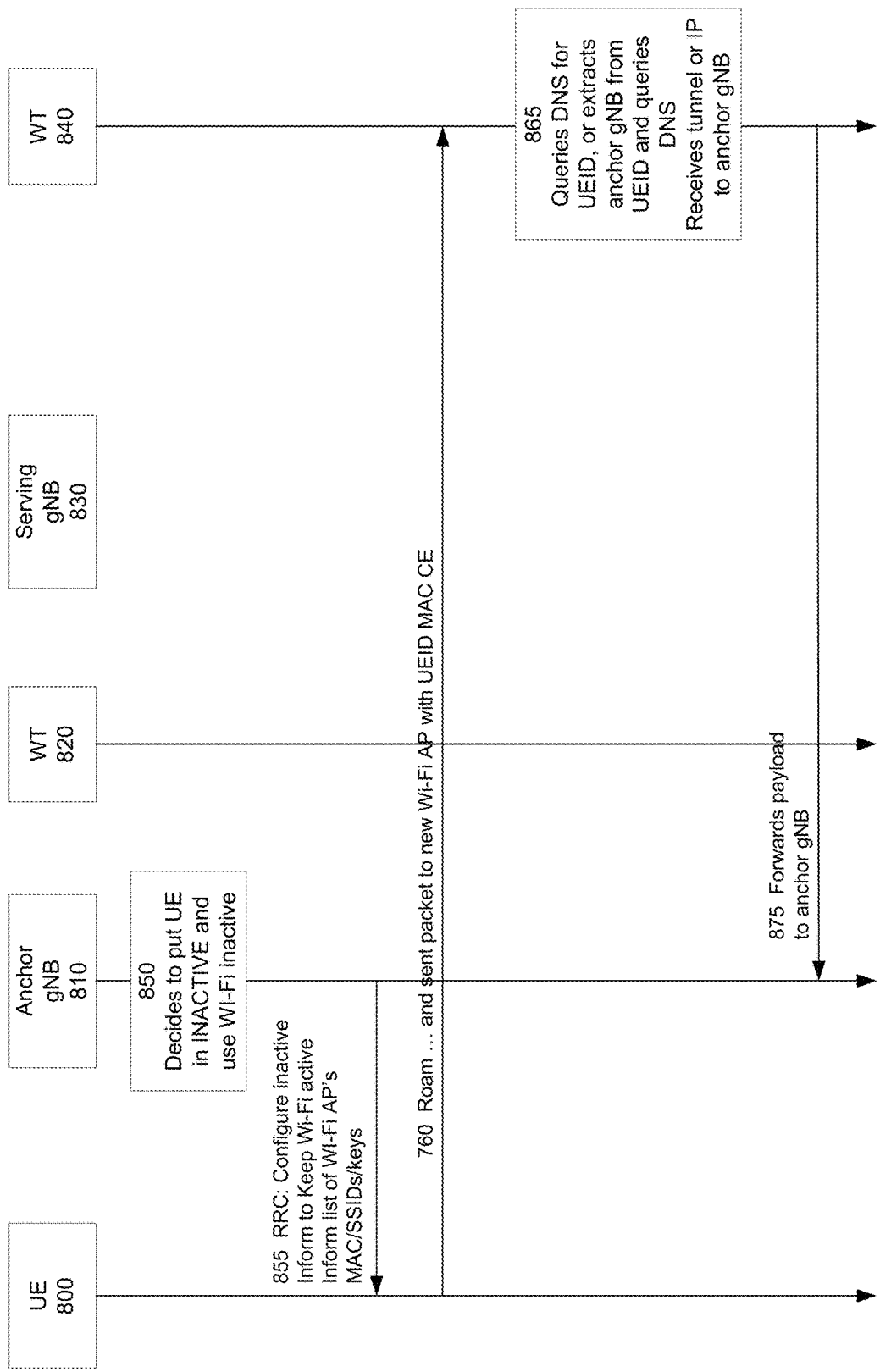
FIG. 8 is a signaling diagram illustrating an embodiment of a method for uplink transmission while the UE is RRC_INACTIVE and the WT is configured to identify the destination to push the LWA-INACTIVE payload.

FIGS. 7 and 8 are signaling diagrams for the case where a UE is configured to transmit to different WT and where there is no established Xw links. Two alternatives are illustrated. One alternative is illustrated in FIG. 7 where the target WT is "linked" to a "master" gNB that handles the forwarding, and the other alternative is illustrated in FIG. 8 where the WT handles the forwarding. The signaling involved in initial access to the AP is not shown, and only logical connections are displayed. Step 760 may be carried over the air as part of the authentication process. Additionally this message may be sent without data and is only used to establish connections. Once the connection is established the payload is sent. These interactions are not shown.

Referring now to FIG. 7, in one embodiment, the WT acts as a transparent relay with a master gNB handling the LWA Inactive payload. Initially, at step 750, anchor gNB 710 makes a determination to put UE 700 in RRC_INACTIVE and use Wi-Fi inactive. In step 755 gNB 710 uses the RRC connection to configure the UE 700 as RRC_INACTIVE and informs the UE 700 to keep Wi-Fi active and informs the UE 700 of list of WI-FI AP's MAC/SSIDs/keys. After roaming, in step 760, UE 700 sends a packet to a new Wi-Fi AP (in this example WT 740) with UEID. The WT 740, in step 765, then forward the payload to serving gNB 730 which is the master gNB for the WT 740. The serving gNB 730, in step 770, queries DNS for UEID or extracts anchor gNB 710 from UEID and queries DNS. gNB 730 then receives a tunnel or IP to anchor gNB 710 and, in step 775, forwards the payload to anchor gNB 710.

Referring now to FIG. 8, in another embodiment, a WT is configured to identify the destination to push the LWA-inactive payload. Similar to the method illustrated in FIG. 7, initially, at step 850, anchor gNB 810 makes a determination to put UE 800 in RRC_INACTIVE and use LWA_INACTIVE (since the WT needs to determine next steps and differentiate this UE from UEs having configured Xw's). In step 855 gNB 810 uses the RRC connection to configure the UE 800 as RRC_INACTIVE and informs the UE 800 to keep Wi-Fi active and informs the UE 800 of list of WI-FI AP's MAC/SSIDs/keys to utilize. After roaming, in step 860, UE 800 sends a packet to a new Wi-Fi AP (in this example WT 840) with UEID MAC CE. In this embodiment, at step 865, WT 840 queries DNS for UEID or extracts anchor gNB 810 from UEID and queries DNS. WT 840 then receives a tunnel configuration such as IP address to the anchor gNB 810 and, in step 875, forwards the payload (i.e., packet) to anchor gNB 810.

A number of the steps of the methods illustrated in FIGS. 7 and 8 are detailed further below.

One consideration relates to how the UE finds a Wi-Fi AP that it can connect to for an UL-INACTIVE data transmission. First, the UE identifies and connects to a different WT than the one on which the LWA was initially established. Alternatively, the UE is not configured for a connected/active LWA connection but is configured to use a UEID to initiate uplink transmission on LWA. In either case, connection can be achieved using one or more of the following:

The UE, when in connected mode, may be configured with a list of SSIDs and encryption keys, related to APs it is to access and utilize. This list may be tied to a Tracking Area or a RAN notification Area so that the UE does not attempt to find a WT when the UE has observed that it is out of the TA. When the UE leaves its TA, it may be configured to inform the RAN of such, at which point the UE may be configured (or instructed) to reconnect and also may be reconfigured for LWA-INACTIVE or transition into IDLE mode.

The UE may be provided with an IEEE 802.11r configuration allowing rapid authentication while roaming in a BSS/ESS coverage.

The UE may be provided with a list of MAC addresses where its configuration (SSID/security key) is valid.

Further, while in LWA-INACTIVE, the UE can have different means of keeping track of the status of the accessibility with the network. For example, if the UE is configured to not expect DL traffic on LWA, it could still monitor periodically (similar as a DRX interval to monitor SI) the surrounding Wi-Fi-Aps. The UE may then re-establish connection to one of these APs as required so that the UE is substantially always prepared to send a packet. Alternatively, the UE may be configured to save energy and never monitor Wi-Fi-Aps, and instead wait until a packet is generated to begin the procedure of scanning and attaching to a WT.

If the UE is expected (by configuration) to receive DL traffic, then one of the following solutions may be implemented. In one solution, the UE informs the gNB that it has lost the connectivity to LWA. It may for example be configured to return to RRC_CONNECTED as soon as it loses LWA connectivity, and wait for any further gNB RRC configuration, or it may send such information/request using an RRC-INACTIVE UL-Tx. Alternatively, the WT may detect the lost UE and be configured to inform the gNB of same.

Means for authentication may also be provided. In the embodiments of the present method as depicted in FIGS. 7 and 8, it is assumed that the WT receives no specific UE authentication information. In some embodiments, the WT queries all the same AAA and determines that the server has been configured with the UE, however, this is not necessary. Rather, the UEs are configured with a generic key to access the WT. The WT identifies the UE transmitted with such a key and, therefore, treats the packets accordingly to the "INACTIVE mode" forwarding. Alternatively, the WT/Wi-FiAP may provide an unauthenticated network that would allow UEs configured in LWA-INACTIVE to associate with a WT/Wi-FiAP These UEs may then be configured to send packets to a default WT IP as seen from the WiFiAP, and the WT may be configured to apply the defined forwarding method (including potentially authenticating the UE, or forwarding to another entity).

The embodiments of the present method as depicted in FIGS. 7 and 8, comprise a method for sending LWA-Inactive UL data. For a UE to transmit a packet in LWA-Inactive, the following pre-conditions may be put in place:

a WT can receive the packet (i.e. the UE has attached to it and there is some implicit connection status between the UE and WT); and this WT can identify from the payload and connection status (i) that it represents an inactive Data transmission and (ii) what to do with the payload.

As such, WTs may be configured to support the above, and optionally advertise such support.

There are at least two options for WT operations, given the stack model and depending on the deployment architecture. In one option, the WT may blindly forward the packet to its 'master' gNB and the master gNB continues treating the payload the same as it would have if the master gNB received the payload from the 5G (e.g. cellular) RAT. In this case, the WT can then receive a confirmation message that the gNB can process the message. This forwarding is considered "blind" in that the WT does not process the payload.

It is assumed that the UE sends the packet to a known WT, and properly configured for mobility (provided TA or other mobility parameters) it could be considered that the packet will reliably reach the anchor gNB. Alternatively the WT may forward the gNB's response (acknowledgment or errors) to the UE.

In the other option, the WT is configured to process the payload and identify from it where to push it (e.g., an anchor gNB).

In either case, the WT may be configured to identify first that it is receiving a valid payload for this kind of treatment and forwarding (e.g., by referring to a preamble or integrity protection field). The WT may choose to ignore the payload if it cannot validate it or process it and identify what to do with it. Alternatively the WT may reply with a packet containing a control signaling informing of the type of error.

The embodiments of the present disclosure that are illustrated in FIGS. 7 and 8, and described above, may possibly require more standardization work than the other embodiments provided and illustrated in FIGS. 4-6. However, these embodiments potentially enable UE roaming at large and also potentially reduce the amount of active Xw tunnels.

In some embodiments, changes to standards may be made to implement the above-described method and system. Such changes may include, for example, standards for LWA-INACTIVE transmission that a WT can identify and forward to a gNB for further handling, or a WT capable of identifying (and applying same methods serving gNB would) anchor gNB and forwarding to the anchor gNB. Also, in some embodiments standards may be changed to define Xw variation (default Xw?) to support this forwarding.

Figure 9:
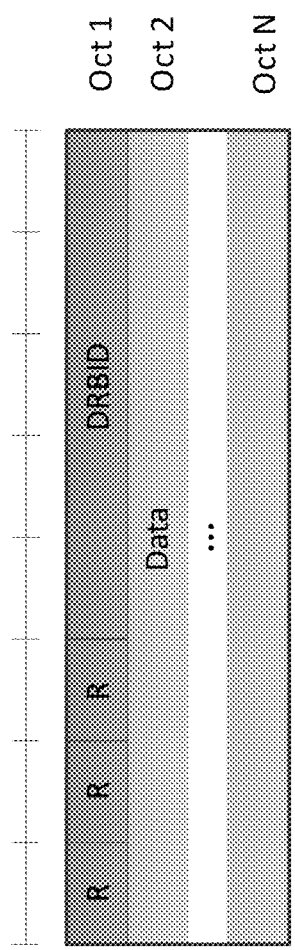
FIG. 9 illustrates an embodiment of an LWAAP data PDU.

FIG. 9 illustrates the LWAAP header used for the LWA to link a received TB to the appropriate DRB. The DRBID field maps directly to a valid DRB of the UE's context at the PDCP layer at the receiving side (UE or gNB). And the data is the payload. Where the inactive transmission is applied on an Active LWA transmission, then the existence of the Xw, which is specific to one UE, allows reuse of this configuration, as the WT is able to identify the UE and map it to the correct Xw.

In the case in which there is an LWA-Inactive transmission, then the WT may be required to possess or receive enough information to provide upstream (once forwarded) the knowledge of the UE (and DRB).

Figure 10:
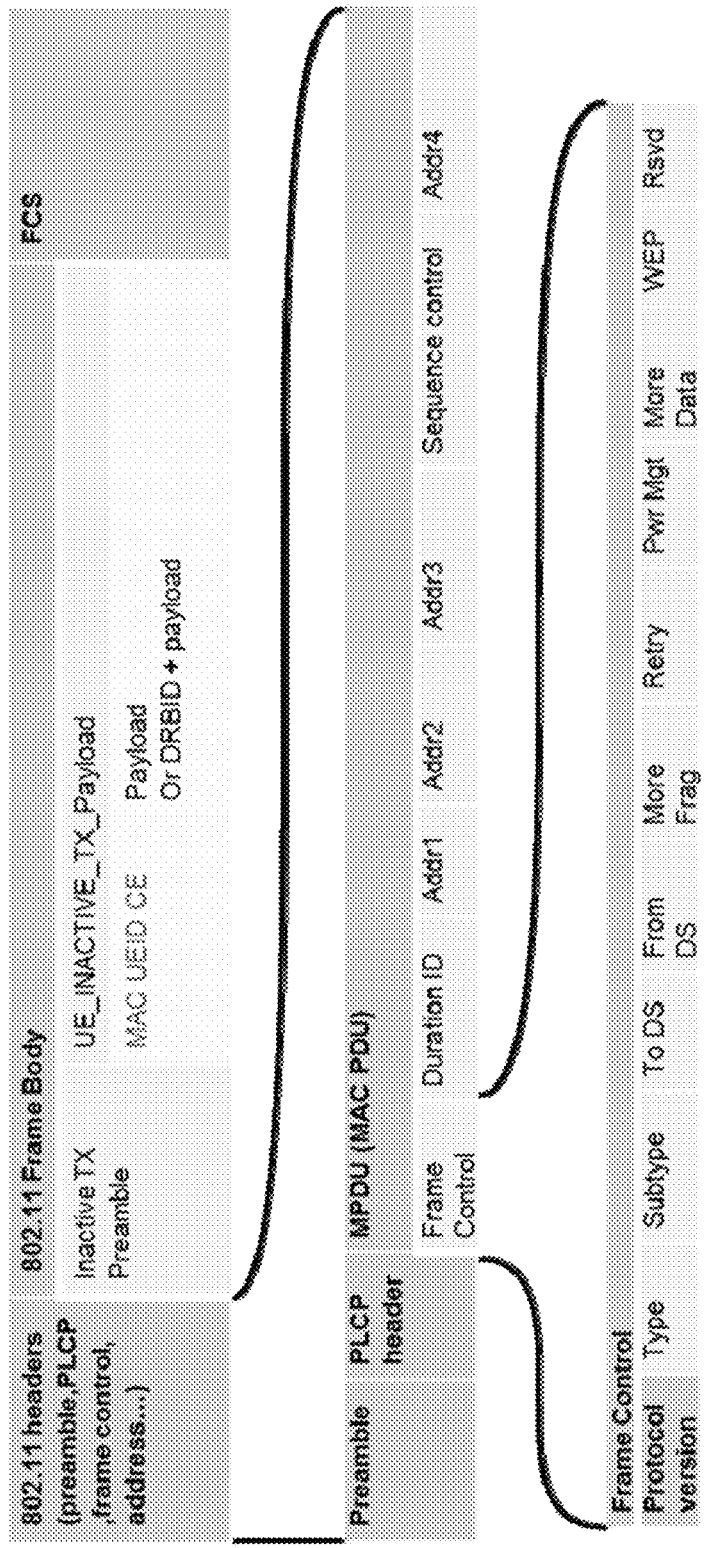
FIG. 10 illustrates an example of an IEEE 802.11 frame that may be used for transmitting an LWA-INACTIVE UL transmission using the method and system described herein.

FIG. 10 illustrates an example of an IEEE 802.11 frame that may be used for transmitting an LWA-INACTIVE UL transmission using the method, system and apparatus of the present application. The IEEE 802.11 headers typically must remain, but the frame body should have the following:

1. (optional) A preamble or prefix, which contains, if necessary, information for integrity/validation or potentially context related information known by the UE;
2. A means to identify where and how to send the payload; and
3. The payload In some situations the payload may not be present, and is only transmitted at a later time after the LWA has transitioned into LWA-ACTIVE.

The preamble can be set per UE, TA or group of UE. For example, WTs in a TA may be provided with a list of acceptable preambles and gNBs may assign one of them to each UE in INACTIVE. Preambles can be temporary, e.g.

with an expiration time and/or date, or other expiration condition. This may force UEs to reconnect to RAN to be reconfigured with new INACTIVE LWA preamble as needed. A Preamble could be the first X bits of UEID, depending on the format UEID ends up using.

In one embodiment, items 2 and 3 from the list above can directly be the same TB that would otherwise be sent in RRC-INACTIVE over 5G; for example, UEID+Payload. Optionally, the payload may use the same LWAAP or the same 5G MAC headers to identify DRBs (LCIDs).

In another embodiment, item 2 can be a valid tunnel end point identifier (TEID) with an IP address, which is a preconfigured (at the receiver entity of the end point) tunnel which has not been configured previously at the WT. For example the TEID and IP address may identify the anchor gNB for the UE and the gNB may have information mapping this TEID to the PDCP layer. In some embodiments an extra integrity protection field may then need to be provided from the preamble or recomputed from it and the payload and sent to the gNB.

In some embodiments a RRC message may be sent to enable state transitions over the WT interface link.

Additionally, the payload may be required to be a valid PDCP payload, unless the WT supports an RLC layer. If it does support an RLC layer, the RLC status may be required to be reset at every new WT connection/reconnection or after a given delay (timer). There are other scenarios where it may not be a valid PDCP payload.

As illustrated in FIG. 10, for a more optimized use of resources, the IEEE 802.11 header can provide multiple fields that can be used to provide the information required. For example, the address fields in the IEEE 802.11 header can be repurposed to indicate a WiFi anchor's MAC address or even a gNB anchor ID of some sort or UEID.

FIG. 10 further illustrates details of the frame control within the 802.11 headers. For example, setting ToDS and FromDS to a specified setting could be understood by the WT as:

ToDS=1, From DS=1
Addr1=target WiFiAP MAC,
Addr2=Anchor WiFi AP,
Addr3=source address (UE MAC).
Addr4=UEID In the above, the Addr1 is the targeted AP for this transmission, Addr2 may be the original LWA WT before being configured inactive and Addr4 provides the UEID instead of having it in the frame body.

Note that encapsulating the RRC-INACTIVE transmission offers some simplicity to minimize the procedures at the WT. Whereas using the above may require the WT to reformat the payload using different fields instead of simply decapsulating and forwarding the payload.

Additionally, each AP should be configured to either forward via Wi-Fi, relaying across a same BSS to reach the associate anchor gNB, or configured to be routed via backhaul.

Two alternatives of RRC_INACTIVE are referred to as Solution A and Solution B (see, for example, http://www.3gpp.org/ftp/tsg_ran/WG2_RL2/»R2-1700185 R2-1700185, Huawei, "UL data transmission without RRC signalling without initiating transition to active (option A)", 3GPP RAN2 NR Ad-Hoc meeting (January 2017)). Solution A implies there is no requirements of RRC message in the UL transmission, whereas Solution B requires to be able to change the UE into RRC_CONNECTED and could therefore require RRC messaging over LWA. The above description of the present method, system and apparatus for UL transmission is readily applicable to Solution A.

Solution B of RRC_INACTIVE implies there is an RRC message to reconnect the UE upon UL Transmission. In this case, some embodiments include modifications to the present method, system and apparatus for UL transmission.

If the LWA link is mostly an active version of the link (established Xw) then the link does not require a full reconnection over (e.g. cellular) 5G, unless the gNB desires to change a configuration and needs an RRC connection. However, it may still be desirable to have a UE reconnection procedure. This would require an LWA-RRC connection over which the UE is instructed by the serving gNB to reconnect. The main difference in LWA is that at this point there is still not necessarily a guarantee that the UE actually has the signal quality to connect to the serving gNB. The procedure may therefore be changed, according to embodiments of the present disclosure, to accommodate for this possibility.

One option for supporting the above includes an RRC message being piggy backed over LWA to the UE to request it to start a connection procedure to a cellular infrastructure (e.g., as indicated by a CellID or similar ID) of its choice. Eventually this RRC message can contain directive indicating preferred cells (which are attached to gNBs).

Alternatively, the UE may be configured to provide cell ID measurement reports, or other control messaging, when it transmits data to a WT in inactive mode to let the RAN decide whether to reconnect and, possibly, select where to reconnect. It is possible however that there are deployments where the UE does not see any Cell and will not be reconnected. It is also possible that the UE may see cells of other RATs (e.g., 3G or 4G) that do not support RRC-INACTIVE and the RAN may decide to require the UE to reconnect to those RATs.

Figure 11:
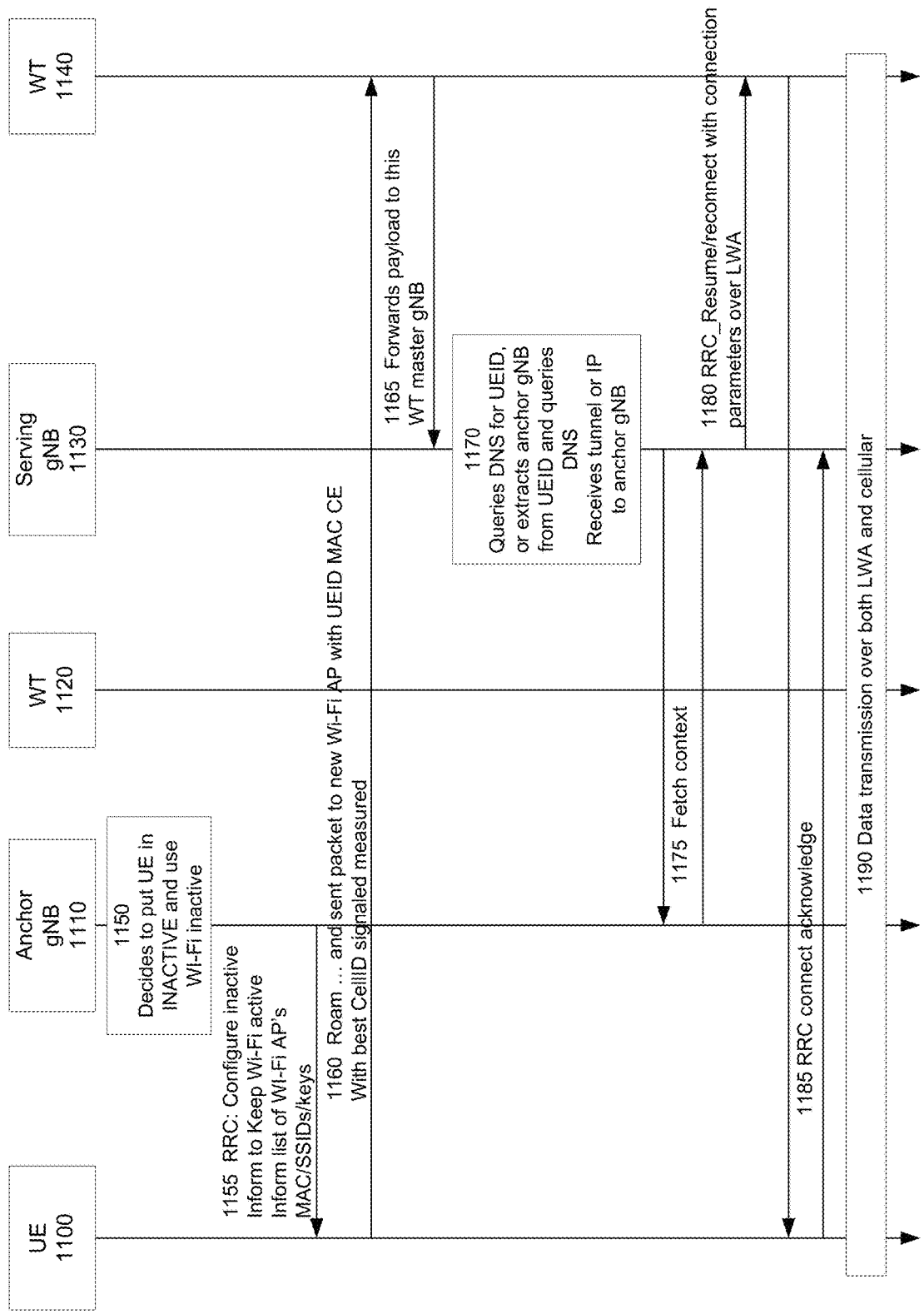
FIG. 11 is a signaling diagram summarizing one embodiment of operations for LWA-INACTIVE uplink transmission in RRC_INACTIVE Solution B.

In order to provide support for Solution B, it may be desired to support a minimum reconnection RRC messaging over LWA. As illustrated in FIG. 11, the UE may provide in its first transmission, a cell-ID or a list of cell-IDs with preference/quality levels. The WT may then identify one gNB to talk to from that list. The gNB may fetch the context from the anchor gNB as in RRC-INACTIVE Solution B and then request over LWA for the UE to reconnect, possibly by directly providing the reconnection parameters to simplify the reconnection procedure.

FIG. 11 is a signaling diagram summarizing operations for LWA-INACTIVE uplink transmission in RRC_INACTIVE Solution B. The illustrated operations are similar to those of FIGS. 7 and 8, but adapted to provide support for Solution B.

Initially, at step 1150, anchor gNB 1110 makes a determination to put UE 1100 in INACTIVE and use Wi-Fi inactive. In step 1155 gNB 1110 uses the RRC connection to configure the UE 1100 as RRC_INACTIVE and informs the UE 1100 to keep Wi-Fi active and informs the UE 1100 of list ap WI-FI AP's MAC/SSIDs/keys. After roaming, in step 1160, UE 1100 sends a packet to a new Wi-Fi AP (in this example WT 1140) with UEID MAC CE. This step 1160 is performed with the best CellID signal measured. In step 1165 WT 1140 forwards the payload to the identified gNB for the Cell, identified in FIG. 11 as serving gNB 1130. In this embodiment, at step 1170, serving gNB 1130 queries DNS for UEID or extracts anchor gNB 1110 from UEID and queries DNS. Serving gNB 1130 then receives a tunnel or IP to anchor gNB 1110 and, in step 1175 communicates with the anchor gNB 1110 to fetch context. In step 1180 serving gNB 1130 performs an RRC_Resume/reconnect with connection parameters over LWA with the WT 1140. In step 1185 WT 1140 transmits an RRC connect acknowledgment to UE 1100, which then transmits the RRC connect acknowledgement to serving gNB 1130. Finally, at step 1190, data transmission occurs over both LWA and 5G (e.g. cellular).

The method, system and apparatus for uplink transmission that use RRC_INACTIVE, as described herein, reduce the complexity of UE mobility and short UL transmission.

With respect to authentication, there is some variability in timing. For example, data can be sent within authentication request. Alternatively, data can be sent without authentication, but a short MAC-I (integrity protection) may be transmitted in data.

Embodiments of the present invention may be implemented by introducing changes to existing or proposed standards, such as 3GPP standards. For example, the following standard related items may be addressed to enable a form of LWA connectivity while a UE is in RRC_INACTIVE state:

Define Xw for inactive;
Define default Xw or method for WT to talk to one gNB or the anchor gNB to transfer inactive payload;
Define WiFi protocol for inactive (e.g. describing how the payload is formatted and/or what header information is used);
Define a possible response message (e.g. a PDCP ACK, a Wi-Fi ACK, and whether RLC layer is used or not for the response message);
Define a mechanism for transitioning back to LWA connected mode (e.g. where RAN reestablishes a Xw tunnel for the UE at that WT). This can be implicit via current method of enabling LWA, or this can be a resume method;
Define RRC over LWA: this may be used to enable reconfiguration of the UE for LWA inactive roaming without having to switch back to RRC-CONNECTED;
Define LWA uplink support.

Embodiments of the present invention provide for a UE, gNB, WT, or system comprising some or all of same. These devices are adapted to operate in one or more manners as described herein. The adaptation can be made for example by configuring automatic operations of the devices. The particular configuration can be made via configuration of appropriate hardware, software, firmware, or a combination thereof. As such, for example, a microprocessor or other controller of the device can be configured to execute instructions stored in memory in order to carry out operations as described herein. Additionally or alternatively, other electronic hardware components (e.g. FPGAs, ASICs, digital logic circuits, etc.) can be configured to execute logic functions in order to carry out operations as described herein.

Figure 12:
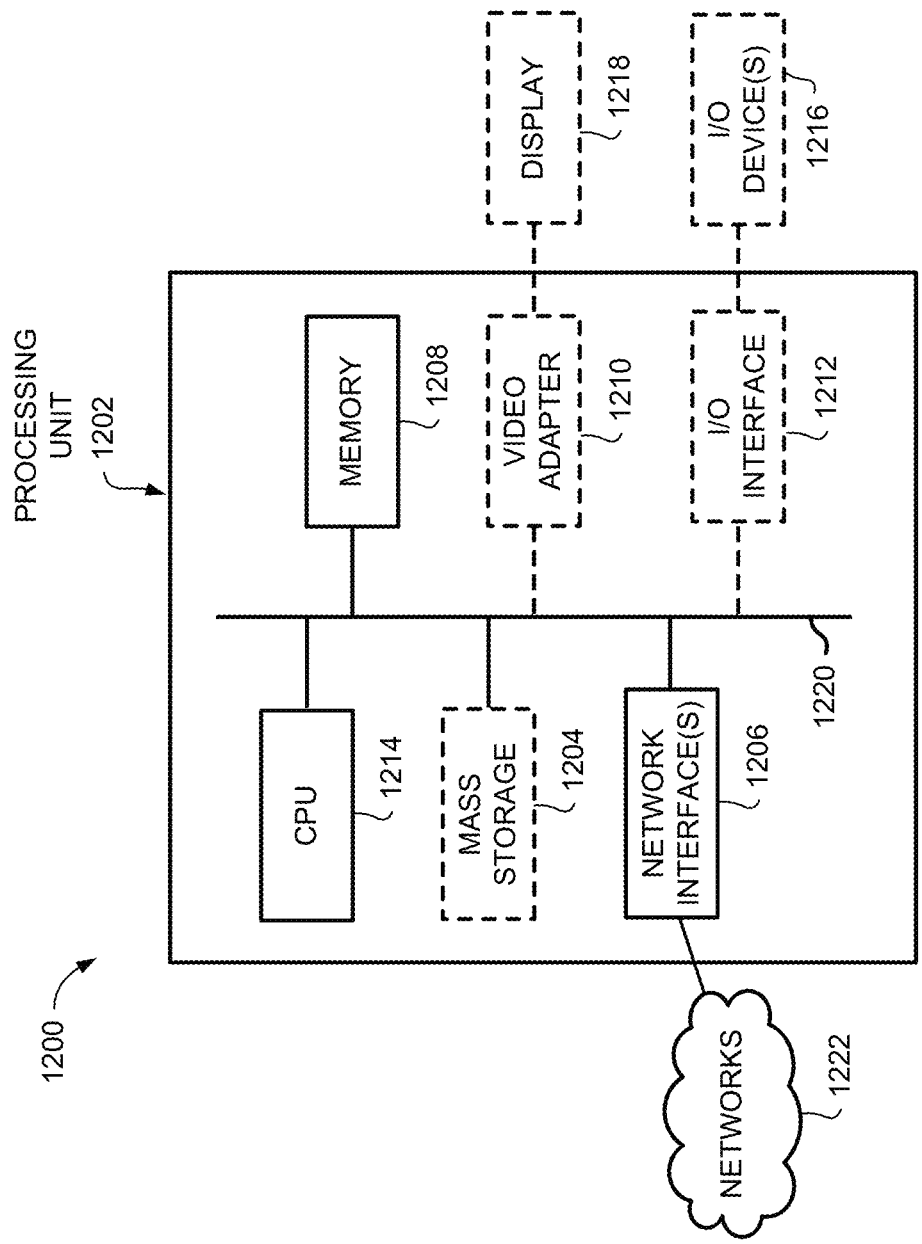
FIG. 12 is a block diagram of a computing system that may be used for implementing the devices and methods disclosed herein.

FIG. 12 is a block diagram of a computing system 1200 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1200 includes a processing unit 1202. The processing unit 1202 typically includes a central processing unit (CPU) 1214, a bus 1220 and a memory 1208, and may optionally also include a mass storage device 1204, a video adapter 1210, and an I/O interface 1212 (shown in dashed lines).

The CPU 1214 may comprise any type of electronic data processor. The memory 1208 may comprise any type of non-transitory system memory such as static random access memory (SRAM), dynamic random access memory (DRAM), synchronous DRAM (SDRAM), read-only memory (ROM), or a combination thereof. In an embodiment, the memory 1208 may include ROM for use at boot-up, and DRAM for program and data storage for use while executing programs. The bus 1220 may be one or more of any type of several bus architectures including a memory bus or memory controller, a peripheral bus, or a video bus.

The mass storage 1204 may comprise any type of non-transitory storage device configured to store data, programs, and other information and to make the data, programs, and other information accessible via the bus 1220. The mass storage 1204 may comprise, for example, one or more of a solid state drive, hard disk drive, a magnetic disk drive, or an optical disk drive.

The video adapter 1210 and the I/O interface 1212 provide optional interfaces to couple external input and output devices to the processing unit 1202. Examples of input and output devices include a display 1218 coupled to the video adapter 1210 and an I/O device 1216 such as a touch-screen coupled to the I/O interface 1212. Other devices may be coupled to the processing unit 1202, and additional or fewer interfaces may be utilized. For example, a serial interface such as Universal Serial Bus (USB) (not shown) may be used to provide an interface for an external device.

The processing unit 1202 may also include one or more network interfaces 1206, which may comprise wired links, such as an Ethernet cable, and/or wireless links to access one or more networks 1222. The network interfaces 1206 allow the processing unit 1202 to communicate with remote entities via the networks 1222. For example, the network interfaces 1206 may provide wireless communication via one or more transmitters/transmit antennas and one or more receivers/receive antennas. In an embodiment, the processing unit 1202 is coupled to a local-area network or a wide-area network for data processing and communications with remote devices, such as other processing units, the Internet, or remote storage facilities.

Method Actions

Figure 13:
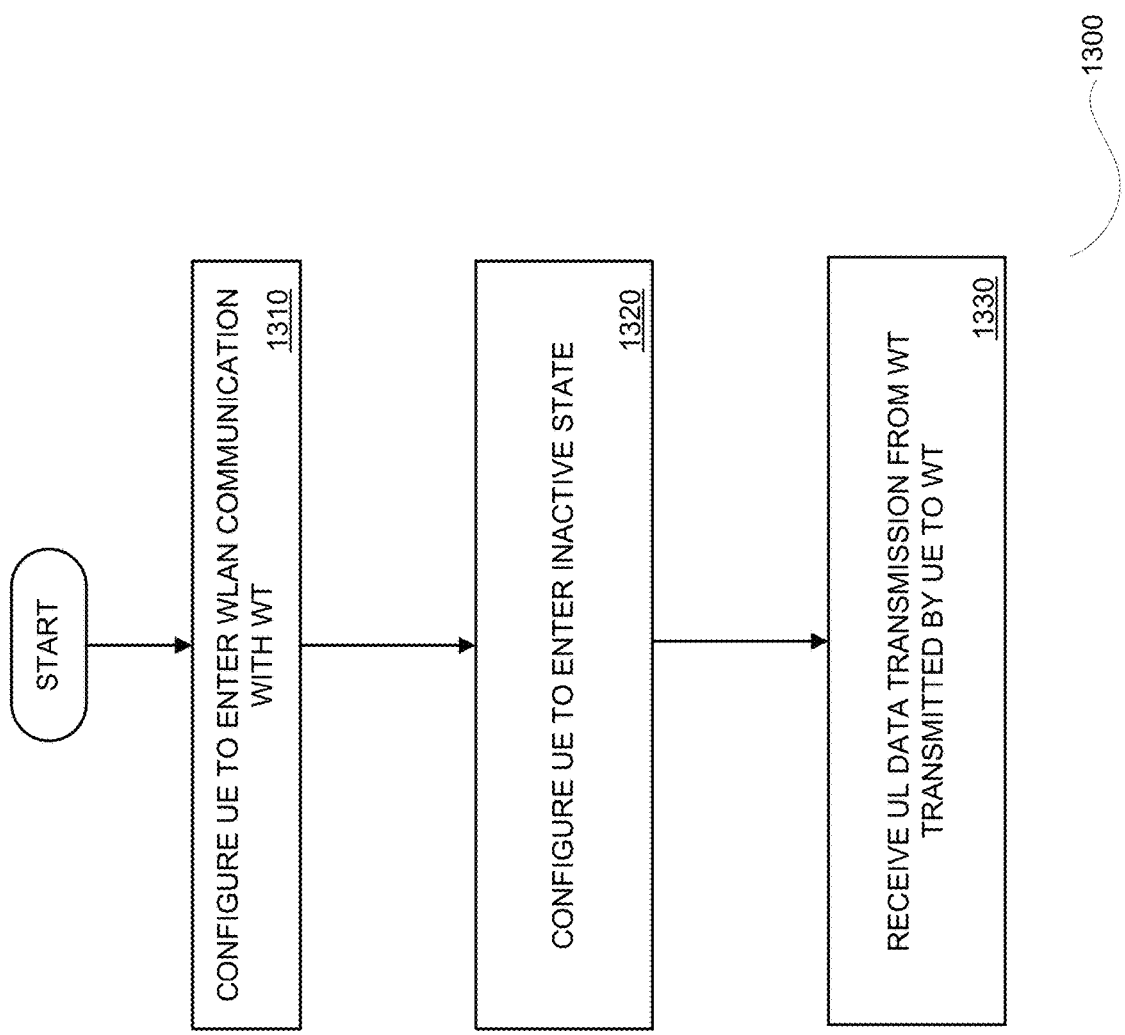
FIG. 13 is a flow chart illustrating an example of a method at the AN for supporting UL data transmission between it and the UE according to an example.

Turning now to FIG. 13, there is shown a flow chart, generally at 1300, of example actions taken at an AN, which may be, without limitation, the gNB 610 and/or anchor gNB 710, for supporting UL data transmission between at least one UE 600, 700 and the AN.

One example action 1310 is to configure the at least one UE 600, 700 to enter into WLAN communication with the WT 620, 720.

One example action 1320 is to configure the at least one UE 600, 700 to enter an inactive state.

One example action 1330 is to receive, from the WT 620, 720, a UL data transmission from the at least one UE 600, 700 to the AN 610, 710 that is transmitted by the at least one UE 600, 700 to the WT 620, 720.

Turning now to FIG. 14, there is shown a flow chart, generally at 1400, of example actions taken at a UE 600, 700, for supporting UL data transmission between the UE 600, 700 and an AN, which may be, without limitation, the gNB 610 and/or anchor gNB 710.

One example action 1410 is to receive a configuration message \to enter into WLAN communication with the WT 620, 720.

One example action 1420 is to receive a configuration message from the AN 610, 710 to enter an inactive state.

One example action 1430 is to thereafter send UL data transmission intended for the AN 610, 710 to the WT 620, 720 for forwarding to the AN 610, 710.

Turning now to FIG. 15, there is shown a flow chart, generally at 1500, of example actions taken at a WT node 620, 720, for supporting UL data transmission between at least one UE 600, 700 and an AN, which may be, without limitation, the gNB 610 and/or anchor gNB 710.

One example action 1510 is to enter an aggregation mode.

While in the aggregation mode, one example action 1520 is to receive a UL data transmission from the at least one UE 600, 700 and intended for the AN 610, 710.

While in the aggregation mode, one example action 1530 is to forward the UL data transmission to the AN 610, 710.

It will be readily understood that, throughout the preceding discussion, the above-described network functionalities and operations may correspond to a method for use in supporting operation of a communication network, such as but not limited to a $5^{th}$ generation wireless communication network. The method may involve computer-implemented functions, namely functions which are implemented by one or more computing, communication and/or memory devices of the network infrastructure. Further, it will be readily understood that embodiments of the present invention relate to a communication network system or associated apparatus thereof, which is configured to perform the above-described network functionalities and operations. Again, the system or apparatus may comprise one or more computing, communication and/or memory devices of the network infrastructure.

Embodiments of the present invention provide for a UE (mobile device) configured to operate in one or more of the manners discussed above, including wirelessly communicating with a gNB and/or WT, preparing and sending messages, receiving and processing messages, storing information in memory, etc. The UE includes at least a wireless communication interface, a processor, and a memory.

Embodiments of the present invention provide for a gNB (eNB) and/or WT configured to operate in one or more of the manners discussed above, including wirelessly communicating with a UE, communicating with other gNBs (eNBs) and/or WTs and/or devices of the core network, preparing and sending messages, receiving and processing messages, storing information in memory, etc. The gNB and/or WT includes at least a wireless communication interface, a network interface, a processor, and a memory.

Embodiments of the present invention provide for a core network device configured to operate in one or more of the manners discussed above, including communicating with gNBs (eNBs), WTs, and/or other devices of the core network, preparing and sending messages, receiving and processing messages, storing information in memory, etc. The core network device includes at least a network interface, a processor, and a memory.

Embodiments of the present invention provide for a system comprising some or all of: a core network device; one or more gNBs, one or more WTs, and a UE.

Embodiments of the present invention may be implemented using specific servers or general-purpose computing, communication and/or memory devices. Computing devices used to implement method operations may include a processor operatively coupled to memory, the memory providing instructions for execution by the processor to perform the method as described herein. Embodiments of the present invention may be implemented at least in part using computing devices such as Application Specific Integrated Circuits, microcontrollers, and digital logic circuits. Embodiments of the present invention may be directed to improving internal operations of the communication network.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

According to a first aspect, there is disclosed a method for supporting data transmission by a UE in an RRC_INACTIVE state, the method comprising: configuring, by an anchor gNB, the UE to enable mobile communication network and WLAN connectivity; and receiving by the anchor gNB, a forwarded pulling data transmission from the WT, wherein the forwarded uplink data transmission had been transmitted to the WT from the UE in the RRC_INACTIVE state.

In an embodiment, the WLAN connectivity can be LWA or LWIP.

In an embodiment, the forwarded uplink data transmission can be received by the anchor gNB directly from the WT.

In an embodiment, the method can additionally comprise: setting up an Xw, by the anchor gNB, between the gNB and the WT.

In an embodiment, the method can additionally comprise: configuring, by the anchor gNB, the WT to use a common Xw, and informing, by the anchor gNB, the UE to remain LWA-ACTIVE and to use LWA-INACTIVE protocol with an embedded UEID when forwarding uplink data transmission.

In an embodiment, the forwarded uplink data transmission can be received by the anchor gNB over a tunnel or IP connection between the anchor gNB and the WT.

In an embodiment, the forwarded uplink data transmission can be received by the anchor gNB from the WT via a serving gNB.

In an embodiment, the anchor gNB can receive the forwarded uplink data transmission from the serving gNB over a tunnel or IP between the serving gNB and the anchor gNB.

According to a second aspect, there is disclosed an apparatus comprising a network interface, a process and a memory. The network interface is for communicating with connected nodes. The memory is for storing instructions that when executed by the processor cause the apparatus to carry out the method(s) of the first aspect.

According to a third aspect, there is disclosed a UE apparatus for use with a wireless communication network, the UE comprising a processor, a memory and a wireless communication interface and configured to carry out a respective portion of the method(s) of the first aspect.

According to a fourth aspect, there is disclosed a gNB of a wireless communication network, the gNB comprising a processor, a memory, a wireless communication interface and a network interface and configured to carry out a respective portion of the method(s) of the first aspect.

According to a fifth aspect, there is disclosed a WT of a wireless communication network, the WT comprising a processor, a memory, a wireless communication interface and a network interface and configured to carry out a respective portion of the method(s) of the first aspect.

According to a sixth aspect, there is disclosed a UE configured to: enter a RRC_INACTIVE state; while in the RRC_INACTIVE state: connected to a WT; and transmit uplink data to the WT, wherein the uplink data is subsequently forwarded by the WT to an anchor gNB.

In an embodiment, the UE can be further configured to include, with the uplink data, information usable by the WT for forwarding the uplink data to the anchor gNB.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for supporting uplink (UL) data transmission between at least one user equipment (UE) and an access node (AN) in a mobile radio access network (RAN) supporting radio communications between the at least one UE and the AN, comprising actions, at the AN of:
    configuring the at least one UE, along a radio communications link between the at least one UE and the AN, to enter into wireless local area network (WLAN) communication with at least one WLAN termination (WT) node;
    establishing, with the at least one WT node, a common communication link wherein the common communication link conveys data from the at least one WT node to the AN for a plurality of the at least one UEs;
    configuring the at least one UE, along the radio communications link, to enter into an RRC-INACTIVE state in which the at least one UE and the AN store a UE AN context but the radio communications link is inactivated; and
    receiving, using the common communication link, from the at least one WT node, a UL data transmission from the at least one UE to the AN that is transmitted by the at least one UE to the at least one WT node.

2. The method according to claim 1, wherein the UL data transmission comprises a UE identifier provided by the at least one UE to the at least one WT node.

3. The method according to claim 2, wherein the AN uses the UE identifier to associate UL data transmissions transmitted by the at least one WT node to the AN with the at least one UE.

4. The method according to claim 1, wherein the action of receiving comprises an action of establishing a separate communication link between the at least one WT node and the AN corresponding to individual ones of the at least one UE.

5. The method according to claim 1, wherein the AN is an anchor AN coupled by a communication link to the at least one WT node and the anchor AN receives the UL data transmission received by the at least one WT node along the communication link.

6. The method according to claim 1, wherein the AN is an anchor AN coupled by a first communication link to a serving AN and the serving AN is coupled by a second communication link to the at least one WT node and the anchor AN receives the UL data transmission received by the at least one WT node from the serving AN along the first communication link after the serving AN has received it from the at least one WT node along the second communication link.

7. The method according to claim 6, wherein the identity of the anchor AN is determined by the serving AN.

8. The method according to claim 6, wherein the identity of the anchor AN is determined by the at least one WT node and forwarded to the serving AN together with the UL data transmission.

9. An access node (AN) in a mobile radio access network (RAN) supporting radio communications with at least one user equipment (UE), comprising:
    a processor; and
    a non-transient memory for storing instructions that, when executed by the processor, cause the AN to perform actions, for supporting uplink (UL) data transmission between the at least one UE and the AN, of:
    configuring the at least one UE, along a radio communications link between the at least one UE and the AN, to enter into wireless local area network (WLAN) communication with at least one WLAN termination (WT) node;
    establishing, with the at least one WT node, a common communication link wherein the common communication link conveys data from the at least one WT node to the AN for a plurality of the at least one UEs;
    configuring the at least one UE, along the radio communications link, to enter into an RRC-INACTIVE state in which the at least one UE and the AN maintain context but the radio communications link is inactivated; and
    receiving, using the common communication link, from the at least one WT node, a UL data transmission from the at least one UE to the AN that is transmitted by the at least one UE to the at least one WT node.

10. A method for supporting uplink (UL) data transmission between a user equipment (UE) and an access node (AN) in a mobile radio access network (RAN) supporting radio communications between the UE and the AN, comprising actions, at the UE of:
    receiving a configuration message, along a cellular radio communications link between the AN and the UE, to enter into wireless local area network (WLAN) communication with at least one WLAN termination (WT) node;
    receiving a configuration message, along the cellular radio communications link, to enter into an RRC-INACTIVE state in which the UE stores a UE AN context but the cellular radio communications link is inactivated, the UE AN context comprising at least a UE AN identifier; and
    transmitting a UL data packet intended for the AN to the at least one WT node, the UL data packet comprising at least the UE AN identifier.

11. The method according to claim 10, further comprising, before the action of sending UL data transmissions, an action of sending an authentication request to the at least one WT node.

12. A user equipment (UE) in a mobile radio access network (RAN) supporting radio communications with an access node (AN), comprising:
- a processor;
- a WLAN radio interface;
- a cellular radio interface; and
- a non-transient memory for storing instructions that, when executed by the processor, cause the UE to perform actions, for supporting uplink (UL) data transmission between the UE and the AN, of:
  - receiving, from the AN using the cellular radio interface, a configuration message to enter into wireless local area network (WLAN) communication with at least one WLAN termination (WT) node;
  - receiving, from the AN using the cellular radio interface, a configuration message to enter into an RRC-INACTIVE state in which the UE stores a UE AN context but cellular radio communications is inactivated, the UE AN context comprising at least a UE AN identifier; and
  - transmitting, to the WT node using the WLAN radio interface, a UL data packet intended for the AN, the UL data packet comprising at least the UE AN identifier.

* * * * *